US012804643B2

(12) United States Patent
Xu et al.

(10) Patent No.: US 12,804,643 B2
(45) Date of Patent: Nov. 17, 2026

(54) RECLAIMING CONFIGURED GRANT (CG) PUSCH TRANSMISSION OCCASIONS

(71) Applicant: QUALCOMM Incorporated, San Diego, CA (US)

(72) Inventors: Huilin Xu, Temecula, CA (US); Shijun Wu, San Diego, CA (US); Diana Maamari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 317 days.

(21) Appl. No.: 18/597,320

(22) Filed: Mar. 6, 2024

(65) Prior Publication Data

US 2025/0287373 A1 Sep. 11, 2025

(51) Int. Cl.

*H04W 72/1268* (2023.01)
*H04W 72/232* (2023.01)
*H04W 76/30* (2018.01)

(52) U.S. Cl.

CPC ..... *H04W 72/1268* (2013.01); *H04W 72/232* (2023.01); *H04W 76/30* (2018.02)

(58) Field of Classification Search

CPC ........... H04W 72/1268; H04W 72/232; H04W 76/30

See application file for complete search history.

(56) References Cited

U.S. PATENT DOCUMENTS

2024/0244657 A1* 7/2024 Papasakellariou ........................... H04W 72/1268
2024/0267924 A1* 8/2024 Maamari ............... H04W 72/23
2024/0323731 A1* 9/2024 Xu ....................... H04B 17/336
2025/0039908 A1* 1/2025 Elshafie ................ H04W 72/23

* cited by examiner

*Primary Examiner* — Congvan Tran
(74) *Attorney, Agent, or Firm* — LOZA & LOZA, LLP

(57) ABSTRACT

Aspects relate to mechanisms for reclaiming configured grant (CG) physical uplink shared channel (PUSCH) transmission occasions (TOs) that were previously released by a user equipment (UE). The UE may transmit an unused transmission occasion (UTO) indication to a network entity releasing one or more unused TOs of a plurality of future CG PUSCH TOs configured for transmission of a packet. The network entity may provide a reclaim indication to the UE indicating at least one unused (released) PUSCH TOs that can be reclaimed by the UE for the transmission of the packet.

26 Claims, 16 Drawing Sheets

RECLAIMING CONFIGURED GRANT (CG) PUSCH TRANSMISSION OCCASIONS

TECHNICAL FIELD

The technology discussed below relates generally to wireless communication systems, and more particularly, to management of configured grant transmission occasions in wireless communication systems.

INTRODUCTION

Wireless communication systems, such as those specified under fifth generation (5G) systems, referred to as New Radio (NR) systems, sixth generation (6G) systems, and other future generations, wireless transmissions between a network entity and user equipment (UE) within a cell are generally scheduled. For example, the network entity may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH) or via higher layer signaling, such as radio resource control (RRC) signaling. For example, a network entity may allocate uplink resources to a UE either dynamically using dynamic signaling (e.g., as downlink control information (DCI) within the PDCCH) or semi-statically as a configured grant using higher layer signaling (e.g., RRC signaling).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a user equipment (UE) includes one or more memories and one or more processors coupled to the one or more memories. The one or more processors can be configured to transmit an unused transmission occasion (UTO) indication to a network entity. The UTO indication releasing one or more unused transmission occasions (TOs) of a plurality of future configured grant (CG) physical uplink shared channel (PUSCH) TOs configured for transmission of a packet. The one or more processors can further be configured to receive a reclaim indication from the network entity. The reclaim indication indicating at least one reclaimed TO of the one or more unused TOs that can be reclaimed by the UE for transmission of the packet.

Another example provides a method operable at a user equipment (UE). The method includes transmitting an unused transmission occasion (UTO) indication to a network entity. The UTO indication releasing one or more unused transmission occasions (TOs) of a plurality of future configured grant (CG) physical uplink shared channel (PUSCH) TOs configured for transmission of a packet. The method further includes receiving a reclaim indication from the network entity. The reclaim indication indicating at least one reclaimed TO of the one or more unused TOs that can be reclaimed by the UE for transmission of the packet.

Another example provides apparatus for wireless communication at a network entity. The apparatus includes one or more memories and one or more processors coupled to the one or more memories. The one or more processors can be configured to obtain an unused transmission occasion (UTO) indication. The UTO indication releasing one or more unused transmission occasions (TOs) of a plurality of future configured grant (CG) physical uplink shared channel (PUSCH) TOs configured for transmission of a packet by a user equipment (UE). The one or more processors can further be configured to provide a reclaim indication indicating at least one reclaimed TO of the one or more unused TOs that can be reclaimed by the UE for transmission of the packet.

Another example provides a method operable at a network entity. The method includes obtaining an unused transmission occasion (UTO) indication. The UTO indication releasing one or more unused transmission occasions (TOs) of a plurality of future configured grant (CG) physical uplink shared channel (PUSCH) TOs configured for transmission of a packet by a user equipment (UE). The method further includes providing a reclaim indication indicating at least one reclaimed TO of the one or more unused TOs that can be reclaimed by the UE for transmission of the packet.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
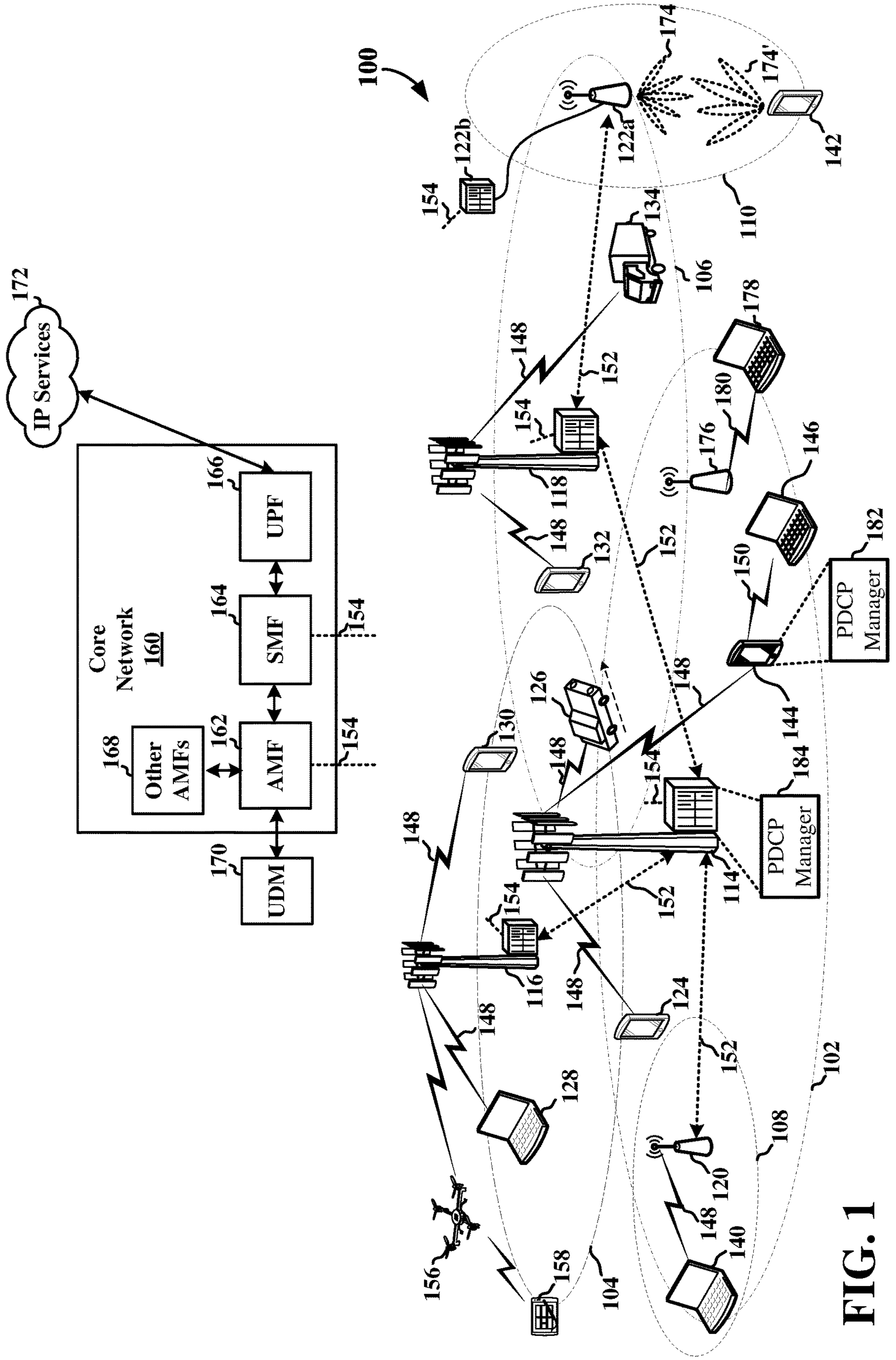
FIG. 1 is a diagram illustrating an example of a wireless communication system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., network entity and/or UE), end-user devices, etc., of varying sizes, shapes, and constitution.

For low latency applications, such as extended reality (XR) applications, uplink packets may be scheduled using configured grants (e.g., semi-persistent scheduling of periodic physical uplink shared channel (PUSCH) transmission occasions (TOs)). For example, the network may configure sufficient uplink resources in a configured grant based on the largest possible XR video packet size. However, to avoid potential waste of unused uplink resources, a UE may release future unused PUSCH TOs to enable the network to reallocate those uplink resources to other UEs.

In some cases, the network may cancel one or more of the PUSCH TOs indicated as being used by the UE for an XR packet transmission. For example, the network may schedule a higher priority downlink or uplink transmission, change the slot format, or activate another configured grant that creates a conflict with one or more PUSCH TOs that the UE had planned to use for the transmission of an XR packet. However, there is currently no mechanism for allowing the UE to reclaim any previously released PUSCH TOs to complete the XR packet transmission.

Various aspects are related to mechanisms for reclaiming configured grant (CG) PUSCH TOs that were previously released by a UE. The UE may transmit an unused transmission occasion (UTO) indication to a network entity releasing one or more unused TOs of a plurality of future CG PUSCH TOs configured for transmission of an XR packet. The network entity may provide a reclaim indication to the UE indicating at least one unused (released) PUSCH TOs that can be reclaimed by the UE for the transmission of the XR packet. In some examples, the UE may further transmit an additional UTO indication to the network entity reclaiming at least one reclaimed TO for transmission of the XR packet.

In some examples, the reclaim indication may be received within downlink control information (DCI). For example, the DCI may include a scheduling DCI that schedules an uplink or downlink transmission that conflicts with at least one used TO of the plurality of future CG PUSCH TOs planned to be used by the UE for transmission of the XR packet. As another example, the DCI may include a slot format indicator (SFI) DCI indicating a slot format of one or more slots. Here, the slot format may conflict with at least one used TO of the plurality of future CG PUSCH TOs planned to be used by the UE for transmission of the XR packet. As another example, the DCI may include an uplink cancellation DCI canceling at least one TO of the plurality of future CG PUSCH TOs planned to be used by the UE for transmission of the XR packet. As another example, the DCI may include a CG activation DCI activating a CG that conflicts with at least one used TO of the plurality of future CG PUSCH TOs planned to be used by the UE for transmission of the XR packet.

In some examples, the reclaim indication includes a single bit indicating a particular unused TO or a plurality of unused TOs that may be reclaimed by the UE. The particular unused TO or the plurality of unused TOs may be immediately after the reclaim indication or after a time period associated with transmission of the reclaim indication. In some examples, the reclaim indication includes a parameter indicating a selected unused TO or a number of unused TOs that may be reclaimed by the UE. The number of unused TOs may be immediately after the reclaim indication or after a time period associated with transmission of the reclaim indication. In some examples, the reclaim indication includes a bitmap indicating at least one selected unused TO that can be reclaimed by the UE. In some examples, the reclaim indication includes an offset from a first unused TO after the reclaim indication. Any reclaimed TOs may thus occur after the offset.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and 122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122*a*/122*b* may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity **122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134**) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity.

For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

Figures 2A, 2B, 2C, 2D:
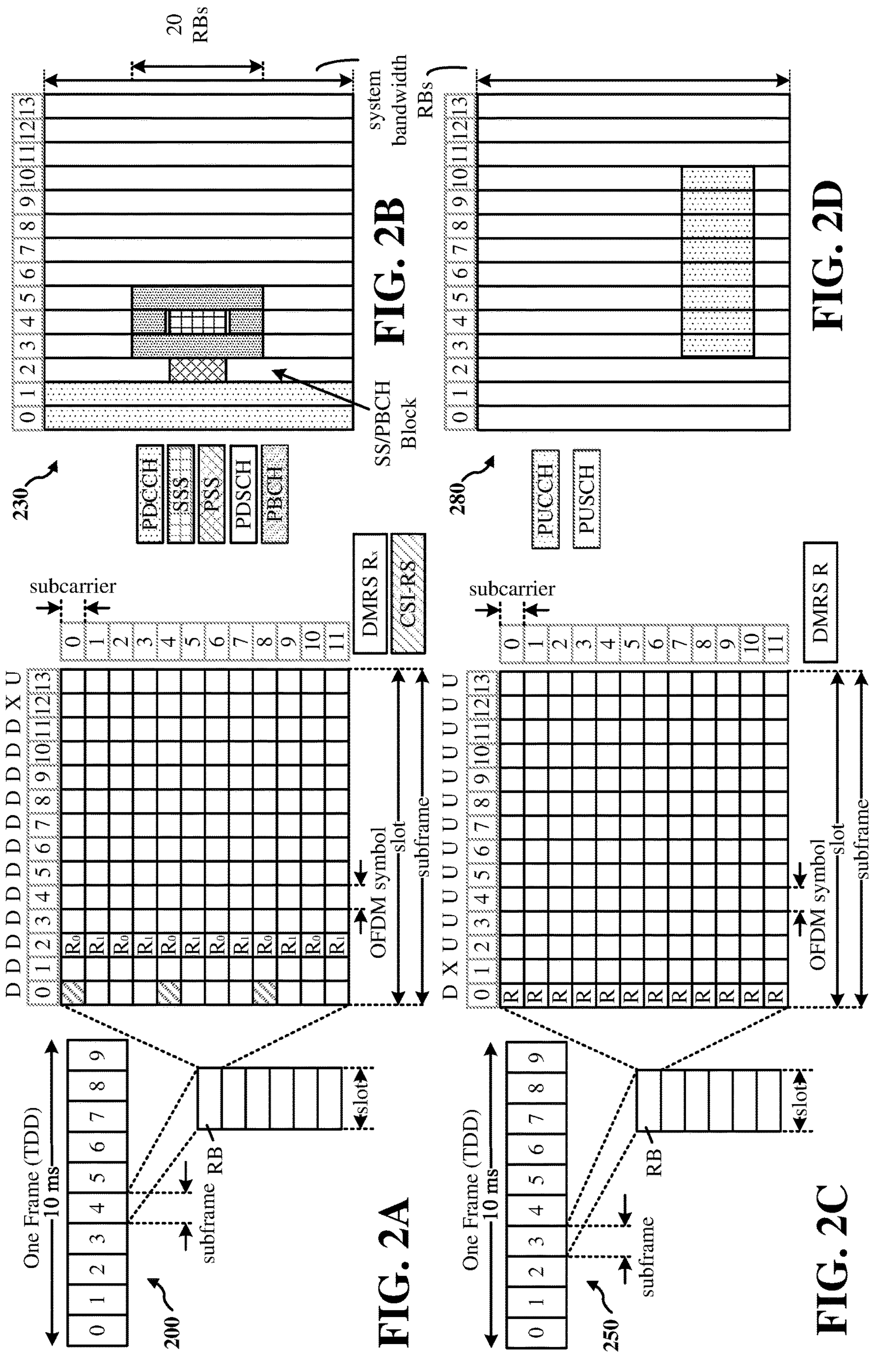
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to 2*15 kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
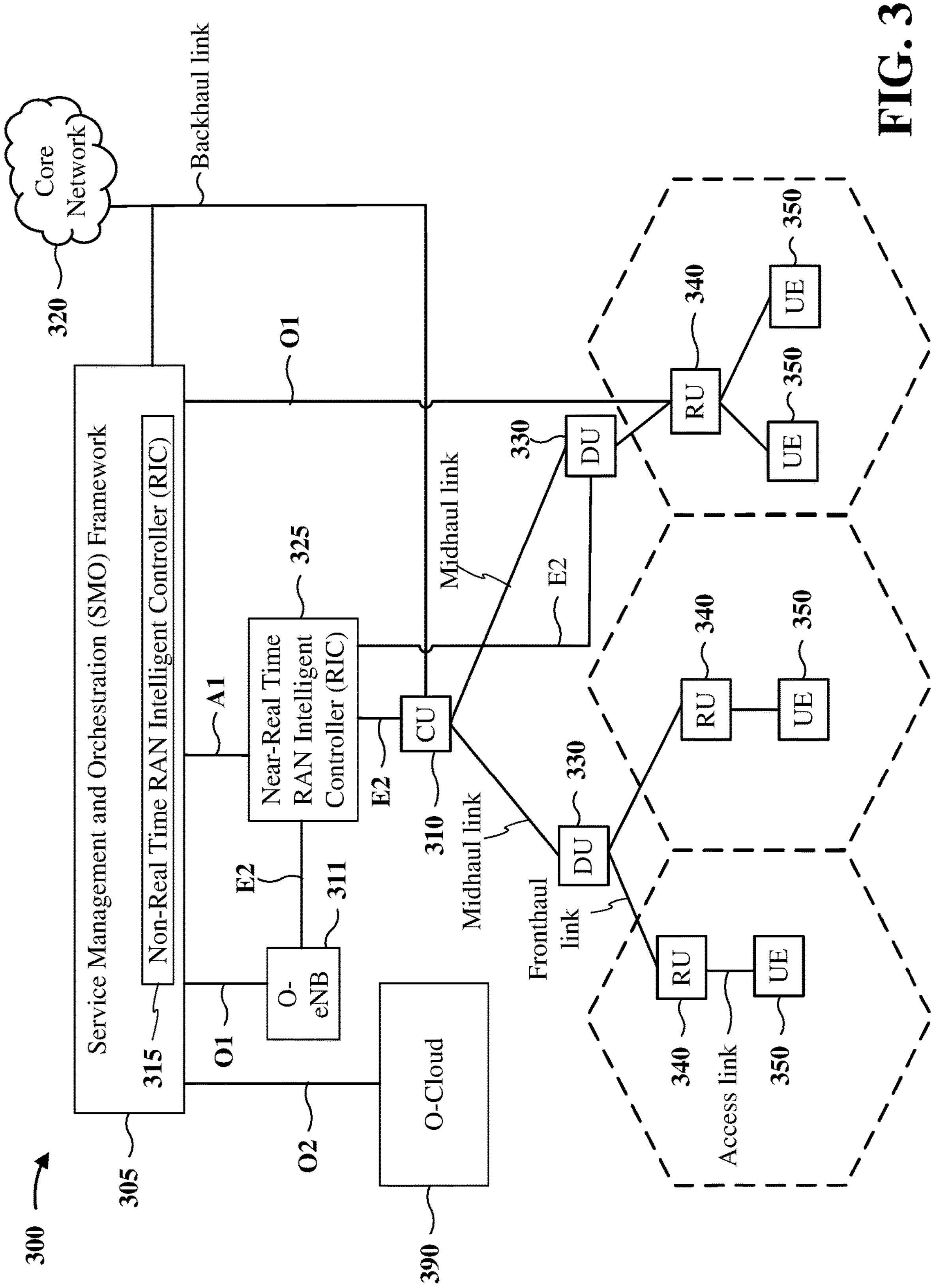
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E3 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O3 interface). Such virtualized network elements can include, but are not limited to, CUs 310, DUs 330, RUs 340 and Near-RT RICs 325. In some implementations, the SMO Framework 305 can communicate with a hardware aspect of a 5G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E3 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as AI policies).

5G NR and future release wireless communication systems are designed to support time critical (low latency) services, such as extended reality (XR) technologies. XR may include, for example, virtual reality (VR), augmented reality (AR), mixed reality (MR) and other immersive technologies. In an example use case, 5G NR networks may be used to offload some of the XR processing and functionality to the edge cloud to enhance the user experience and reduce the cost, size, and weight of head mounted displays (HMDs).

Figure 4:
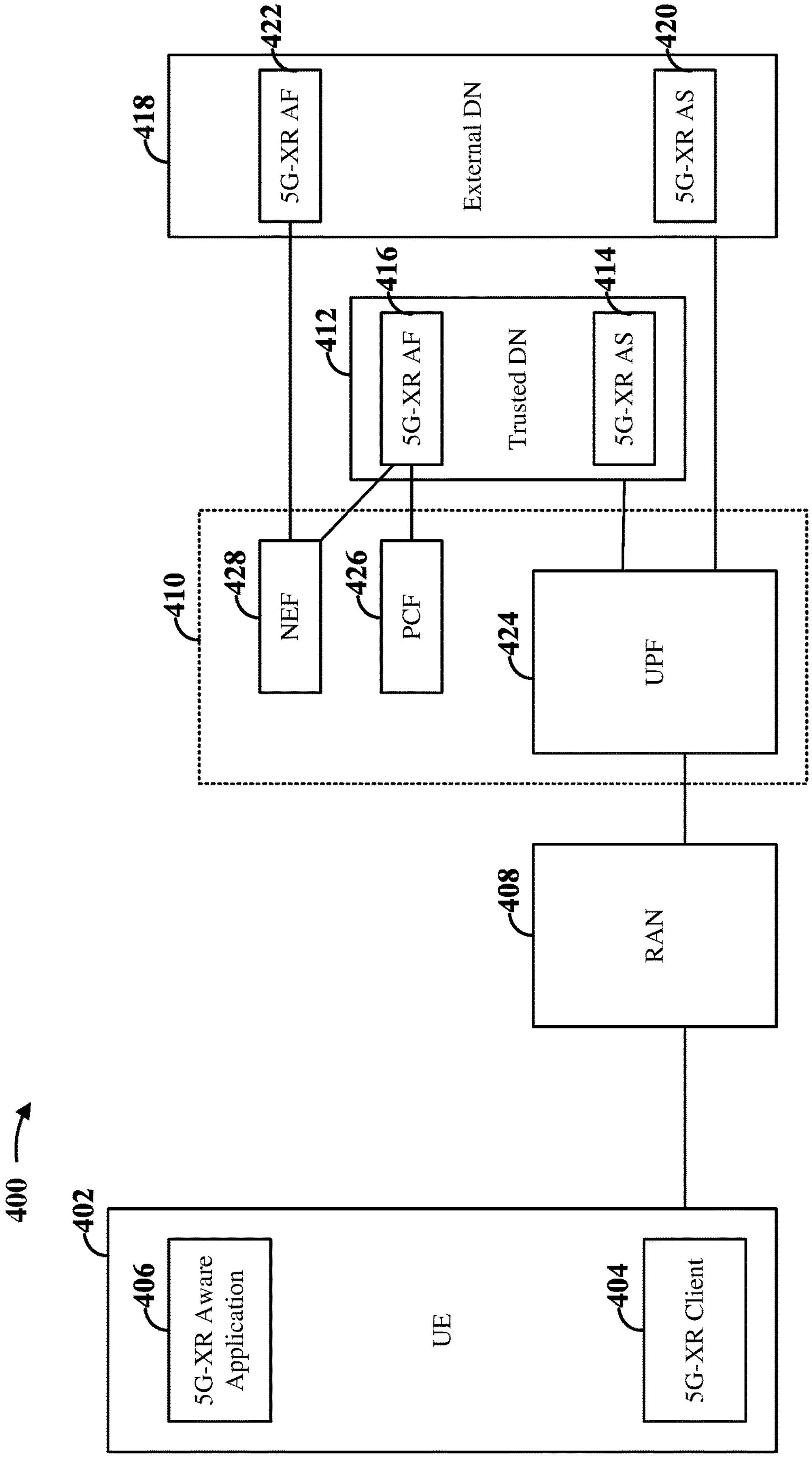
FIG. 4 is a diagram illustrating an example of a wireless communication system supporting extended reality (XR) according to some aspects.

FIG. 4 is a diagram illustrating an example of a wireless communication system supporting extended reality (XR) according to some aspects. The wireless communication system 400 includes a UE 402, such as a HMD, that includes a 5G-NR client 404 configured to communicate with the wireless communication system 400 to perform offloaded XR processing of an XR application and a 5G-NR aware application 406 that performs local XR processing of the XR application on the UE 402. Thus, the 5G-XR client 404 and the 5G-NR aware application 406 collectively execute the XR application on the UE 402.

The wireless communication system 400 further includes a RAN 408 (e.g., one or more gNBs, aggregated or disaggregated base stations, or other radio access network entities) and a core network 410 (e.g., 5G core (5GC)). In some examples, the RAN 408 may correspond to the RAN shown in FIGS. 1 and/or 3. By virtue of the wireless communication system 400, the UE 402 may be enabled to carry out data communication with a trusted data network (DN) 412 (e.g., edge server) or an external data network (DN) 418.

The core network 410 may include, for example, a user plane function (UPF) 424, a policy control function (PCF) 426, and a network exposure function (NEF) 428. The UPF 424 provides user plane connectivity to route 5G NR packets to/from the UE 402 via the RAN 408. The PCF 426 provides policy information (e.g., rules) for control plane functions, such as network slicing, roaming, and mobility management. In addition, the PCF 426 supports 5G quality of service (QoS) policies, network slice policies, and other types of policies. The NEF 428 provides a point of contact for external systems (e.g., the external data network 418) to the wireless communication system 400 (e.g., 5GS). Thus, the NEF 428 exposes the 5GS network functions and makes those functions available to external systems.

In examples in which the offloaded XR processing is housed in a trusted DN 412, the trusted DN 412 may include a 5G-XR application server (AS) 414 configured to terminate uplink user plane traffic (e.g., XR packets) from the UE 402 via the RAN 408 and UPF 424 and provide downlink user plane traffic to the UE 402 via the UPF 424 and RAN 408. The trusted DN 412 may further include a 5G-XR application function (AF) 416 configured to retrieve one or more XR policies from the PCF 426 and/or to communicate with an external DN via the NEF 428. In examples in which the offloaded XR processing is housed in an external DN 418, the external DN 418 may include a 5G-XR AS 420 configured to terminate uplink user plane traffic (e.g., XR packets) from the UE 402 via the RAN 408 and UPF 424 and provide downlink user plane traffic to the UE 402 via the UPF 424 and RAN 408. The external DN 418 may further include a 5G-XR AF 422 configured to retrieve one or more XR policies from the PCF 426 via the NEF 428. Thus, the NEF 428 enables access to the PCF 426 and other core network functions by the 5G-XR AF 422 on the external DN 418.

XR traffic is characterized by large video frame sizes that may vary over time with quasi-periodic packet transmission and arrival. In addition, the Quality of Service (QoS) of XR traffic flows typically requires high reliability and low latency. While dynamic scheduling of XR packets based on the receipt of a scheduling request and buffer status report (BSR) from the UE 402 may accommodate the packet arrival jitter and unknown packet size, to meet the stringent latency requirements of XR traffic, 5G networks may support semi-persistent scheduling (SPS) of uplink grants (e.g., configured grants) for XR UEs 402.

Generally, SPS may be used for periodic communications based on defined settings. For example, SPS may be suitable for applications with predictable, periodic, and/or low latency payloads, such as XR applications. For example, an SPS configuration for downlink transmissions may be configured such that a PDSCH communication may be performed periodically with a certain periodicity. On the uplink, an SPS resource may be referred to as a configured grant (CG). With CGs, just as with downlink SPS configurations, scheduling information corresponding to the uplink CG may be signaled just once to the UE 402. Subsequently, without needing to receive additional scheduling information, the UE 402 may periodically utilize the semi-persistently allocated resources in the uplink CG.

Figure 5:
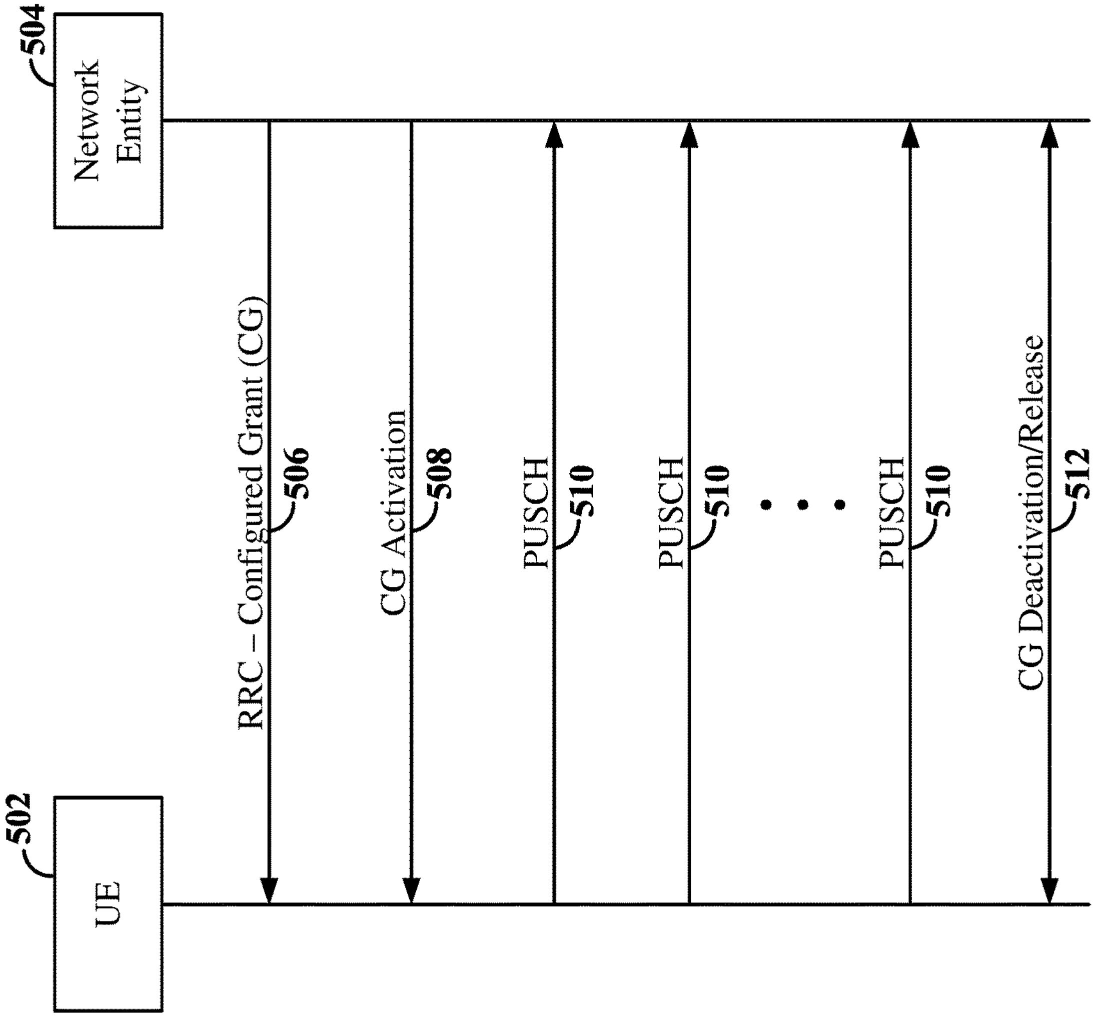
FIG. 5 is a signaling diagram illustrating exemplary signaling for semi-persistent scheduling of configured grants according to some aspects.

FIG. 5 is a signaling diagram illustrating exemplary signaling between a UE 502 and a network 504 for semi-persistent scheduling (SPS) of configured grants according to some aspects. The UE 502 may correspond to any of the UEs or other wireless communication devices shown in any of FIGS. 1, 3, and/or 4. The network entity 504 may correspond to any of the base stations or other network entities shown in FIGS. 1, 3, and/or 4. For example, the network entity 504 may correspond to an aggregated base station, an RU, a DU, a CU, a TRP, an IAB node, or other network device.

At 506, the network entity 504 may configure SPS for a CG for the UE 502 and transmit an SPS configuration of the CG to the UE 502 via, for example, RRC signaling. The SPS configuration may include, for example, an indication of allocated resources for the CG, a semi-persistent scheduling identifier (e.g., an SPS-RNTI) for the UE 502 and a periodicity of the CG. In XR applications, the network entity 504 may configure the SPS grant based on the service requirements of the XR application (e.g., as provided by the PCF). For example, the network entity 504 may configure the SPS grant based on the Quality of Service (QoS) (e.g., a low-latency QoS requirement) to be provided to the UE 502 for XR traffic.

Once configured, in order to begin using the SPS uplink grant (CG), at 508, the network entity 504 then transmits an SPS activation message scrambled with the SPS-RNTI to the UE 502 to activate the SPS uplink grant and enable the UE 502 to utilize the SPS uplink grant based on the SPS configuration parameters. The network may transmit the SPS activation message via, for example, a PDCCH (e.g., DCI within a PDCCH). The SPS activation message may further provide additional SPS configuration parameters, including, for example, an implicit release time, cyclic shift DMRS configuration, modulation and coding scheme (MCS) and/or other parameters.

At 510, the UE 502 may then utilize the assigned uplink resources to periodically transmit uplink traffic (e.g., XR traffic) to the network entity 504 based on the periodicity of the SPS uplink grant (CG). For example, the uplink XR traffic may be transmitted within a PUSCH. During periods of silence or when a data transfer is complete, at 512, the SPS uplink grant may be deactivated/released. For example, an explicit deactivation/release message may be transmitted from the network entity 504 to the UE 502. In other examples, the UE 502 may initiate an inactivity timer with the implicit release time received as part of the SPS configuration parameters, and when the inactivity timer expires, the UE 502 may release the SPS uplink resources.

While the SPS uplink grant is activated, the allocated uplink resources, MCS and other SPS configuration parameters remain fixed. However, retransmissions (e.g., HARQ retransmissions) may be dynamically scheduled between SPS intervals using the SPS-RNTI. In addition, if the radio link conditions change, a new SPS uplink grant (new CG) may need to be configured and activated.

For XR applications, based on the policies provided by the PCF, the network entity 504 may configure the SPS uplink grant to include multiple transmission occasions (TOs) (e.g., multiple periodic uplink resources for SPS uplink XR transmissions) per XR video generation cycle of the XR application. For example, the network entity 504 may configure sufficient uplink resources based on the largest possible XR video packet size.

Figure 6:
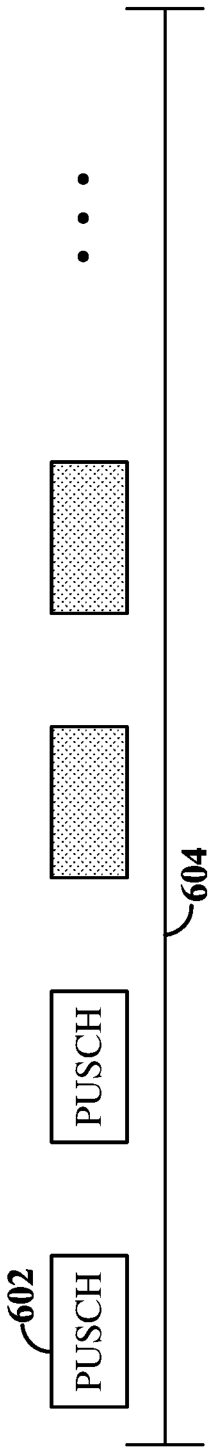
FIG. 6 is a diagram illustrating an example of configured grant (CG) transmission occasions (TOs) of an XR video generation cycle according to some aspects.

FIG. 6 is a diagram illustrating an example of configured grant (CG) transmission occasions (TOs) 602 of an XR video generation cycle 604 according to some aspects. The XR video generation cycle 604 corresponds to the packet generation time for an XR packet and the CG TOs 602 correspond to the PUSCH TOs (multi-CG PUSCH) configured for transmission of the generated XR packet. In an example, the UE 502 may generate an XR packet every 33 milliseconds (ms), and as such the XR video generation cycle 604 may be 33 ms. If the largest packet size for a generated XR packet is 100 Megabits (Mb), the network entity may schedule six PUSCH TOs 602 within each XR video generation cycle 604. In some examples, the maximum number of PUSCH TOs 602 within a cycle 604 may be eight.

At the beginning of an XR video generation cycle 604, the UE is aware of the actual size of the XR packet to be sent, and as such, knows how many PUSCH TOs 602 are needed for transmission of the XR packet. In some examples, the UE may only need to use a subset of the PUSCH TOs for transmission of the XR packet. In the example shown in FIG. 6, the XR packet may be sent across two PUSCH TOs 602, resulting in multiple unused PUSCH TOs. Therefore, although configuring the maximum number of PUSCH TOs based on the maximum XR packet size may minimize the delay in XR video transfer, this may not be an efficient use of resources due to the statistical overbudgeting of resources, resulting in resource waste (e.g., if the number of pre-configured PUSCH TOs 602 within the XR video generation cycle 604 is larger than the average XR video packet size). To avoid potential waste of uplink resources, the UE may indicate to the network entity the used (reserved) and unused (released) CG PUSCH TOs 602 in each XR video generation cycle 604.

Figure 7:
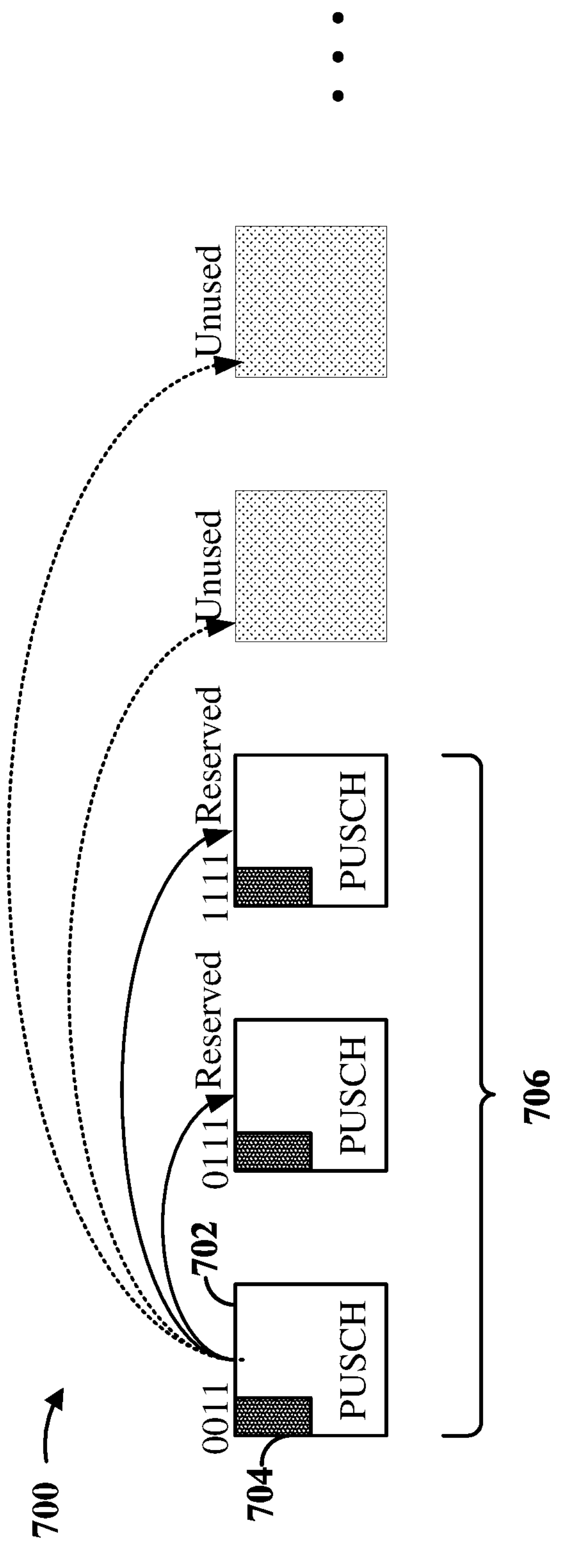
FIG. 7 is a diagram illustrating an example of reporting used and unused transmission occasions according to some aspects.

FIG. 7 is a diagram illustrating an example reporting of used and unused transmission occasions (TOs) 702 within an XR video generation cycle 700 according to some aspects. The UE may report the used/unused PUSCH TOs within, for example, uplink control information (UCI) carrying unused transmission occasion (UTO) information (e.g., a UTO-UCI) 704. The UTO-UCI 704 may be carried in a CG PUSCH TO 702, as shown in FIG. 7, or within another PUSCH or PUCCH.

The UTO-UCI 704 indicates the used/unused status of future (upcoming) CG PUSCH TOs 702. In some examples, the UTO-UCI 704 may include a bitmap with each bit indicating whether a pre-configured CG PUSCH TO 702 is unused. For example, as shown in FIG. 7, the first PUSH CG TO 702 may include UTO-UCI 704 with a bitmap of {0 0 1 1}, indicating that the next two PUSCH CG TOs 702 are used (e.g., not unused) and the following two PUSCH TOs 702 are unused. Thus, the UTO-UCI 704 indicates the video packet transmission time (or a video packet size (length)) 706 of the XR video packet. For large XR data packets spanning multiple CG PUSCH TOs 702, the same CG PUSCH TO may be indicated by multiple consecutive UTO-UCIs 704. In the example shown in FIG. 7, each of the first UTO-UCI 704 and the second UTO-UCI 704 indicates that the third CG PUSCH TO 702 is used (e.g., not unused). In addition, each of the first UTO-UCI and the second UTO-UCI 704 indicates that the fourth CG PUSCH TO 702 is unused.

By indicating the unused CG PUSCH TOs 702 within the UTO-UCI, uplink resource utilization and flexibility may be improved. For example, any CG PUSCH TOs 702 indicated as unused within the UTO-UCI 704 may be reallocated by the network entity to other uplink transmission. Thus, by indicating the CG PUSCH TOs as unused, the UE may release those unused uplink resources back to the network. This allows more resources to be reserved for CG PUSCH to accommodate the largest packet size, and then once the UE becomes aware of the actual packet size, the UE can release unused CG PUSCH TOs by sending the UTO-UCI 704. The released CG PUSCH TOs 702 can then be dynamically allocated to other UEs by the network entity.

In some examples, if the UE determines that one of the CG PUSCH TOs 702 is no longer needed for the XR video packet transmission 706, the UE may switch a CG PUSCH TO indicated as used to unused in a later UTO-UCI 704. However, a CG PUCH TO 702 indicated as unused in an earlier UTO-UCI 704 may not be switched to used (reserved) in a later UTO-UCI 704. Thus, if additional CG PUSCH TOs are needed for the transmission of the XR video packet, the UE is unable to reclaim any previously released (unused) CG PUSCH TOs.

In some examples, dynamic changes in the network may affect the availability of CG PUSCH TOs 702. For example, the network (network entity) may switch some flexible symbols overlapping with a CG PUSCH TO to downlink symbols for a downlink transmission (e.g., by sending a slot format indicator (SFI) within DCI). As another example, the network may dynamically schedule another higher priority transmission in symbols overlapping with a CG PUSCH TO (e.g., by sending a dynamic grant either for a downlink transmission or an uplink transmission). In these examples, the UE may not be allowed to transmit in the overlapping (i.e., conflicting) CG PUSCH TO, even if that overlapping CG PUSCH TO was indicated in UTO-UCI as being used (e.g., not unused). Such dynamic changes in network behaviors may result in insufficient CG PUSCH resources, as the UE's UTO-UCI only accounts for packet size variation. One solution may be to dynamically request (e.g., by sending a scheduling request and BSR) additional resources to compensate for the loss of any conflicting resources. However, it may be infeasible to meet stringent XR video transfer latency requirements using dynamic scheduling.

Various aspects of the disclosure are directed to mechanisms for reclaiming CG PUSCH TOs that have been released. The network entity may provide a reclaim indication to a UE indicating whether an unused CG PUSH TO indicated by an earlier UTO-UCI can be reclaimed by the UE (e.g., converted from unused to not unused). In some examples, the reclaim indication may be sent by the network entity to indicate that one or more CG PUSCH TOs are allowed to be reclaimed. In other examples, the reclaim indication may explicitly state whether reclaiming of a released PUSCH TO is allowed.

Figure 8:
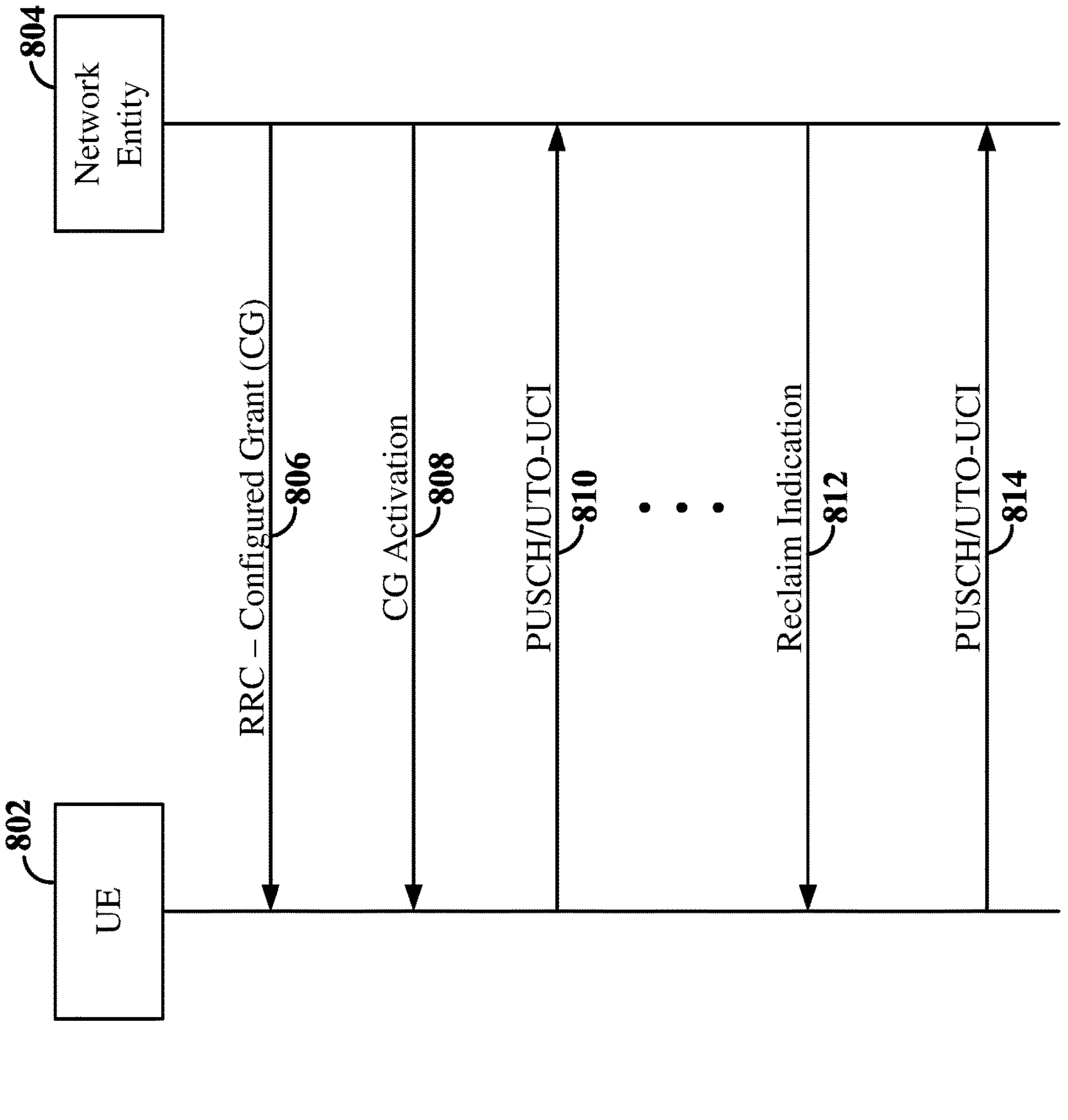
FIG. 8 is a signaling diagram illustrating exemplary signaling for reclaiming configured grant (CG) PUSCH transmission occasions (TOs) according to some aspects.

FIG. 8 is a signaling diagram illustrating exemplary signaling between a UE 802 and a network entity 804 for reclaiming configured grant (CG) PUSCH transmission occasions (TOs) according to some aspects. The UE 802 may correspond to any of the UEs or other wireless communication devices shown in any of FIGS. 1 and/or 3-5. The network entity 804 may correspond to any of the base stations or other network entities shown in FIGS. 1 and/or 3-5. For example, the network entity 804 may correspond to an aggregated base station, an RU, a DU, a CU, a TRP, an IAB node, or other network device.

At 806, the network entity 804 may configure SPS for a CG for the UE 802 and transmit an SPS configuration of the CG to the UE 502 via, for example, RRC signaling. The SPS configuration may include, for example, an indication of allocated resources for the CG, a semi-persistent scheduling identifier (e.g., an SPS-RNTI) for the UE 802 and a periodicity of the CG. In XR applications, the network entity 804 may configure the SPS grant based on the service requirements of the XR application (e.g., as provided by the PCF). For example, the network entity 804 may configure the SPS grant based on the Quality of Service (QoS) (e.g., a low-latency QoS requirement) to be provided to the UE 802 for XR traffic.

Once configured, in order to begin using the SPS uplink grant (CG), at 808, the network entity 804 then transmits an SPS activation message scrambled with the SPS-RNTI to the UE 502 to activate the SPS uplink grant and enable the UE 502 to utilize the SPS uplink grant based on the SPS configuration parameters. The network may transmit the SPS activation message via, for example, a PDCCH (e.g., DCI within a PDCCH). The SPS activation message may further provide additional SPS configuration parameters, including, for example, an implicit release time, cyclic shift DMRS configuration, modulation and coding scheme (MCS) and/or other parameters.

At 810, the UE 802 may then utilize the assigned uplink resources to periodically transmit uplink traffic (e.g., XR traffic) to the network entity 804 based on the periodicity of the SPS uplink grant (CG). For example, the uplink XR traffic may be transmitted within periodic PUSCH TOs configured by the CG. In some examples, one or more of the PUSCH TOs may include an unused transmission indication (e.g., UTO-UCI) indicating a used/unused status of one or more future PUSCH TOs within an XR packet transmission cycle (e.g., XR video generation cycle). For example, the unused transmission indication may release one or more future unused PUSCH TOs expected to be unused for transmission of the XR packet. In other examples, the unused transmission indication (e.g., UTO-UCI) may be transmitted separately from the PUSCH TO (e.g., within a separate PDCCH or PUSCH).

At 812, the network entity 804 may transmit a reclaim indication to the UE 802. The reclaim indication may indicate at least one reclaimed PUSCH TO of the one or more future unused PUSCH TOs that can be reclaimed by the UE for transmission of the XR packet. In some examples, the reclaim indication may indicate one or more particular CG PUSCH TOs that are allowed to be reclaimed. As the network entity 804 may have already allocated one or more future unused PUSCH TOs to other UEs for other transmissions, the reclaim indication may specify the particular PUSCH TOs that may be reclaimed. In other examples, the reclaim indication may indicate whether reclaiming of a released PUSCH TO is allowed.

In some examples, the reclaim indication may be carried in downlink control information (DCI). For example, the DCI may correspond to a scheduling DCI scheduling an uplink transmission or a downlink transmission (e.g., a higher priority transmission for the UE 802) conflicting with (e.g., overlapping) at least one future PUSCH TO indicated by the UTO-UCI as being expected to be used for transmission of the XR packet. For example, the DCI may have a DCI format for scheduling uplink or downlink transmissions (e.g., DCI Format 0_0, DCI Format 0_1, DCI Format 1_0, DCI Format 1_1, DCI Format 3_0, DCI Format 3_1, or other suitable DCI Format). In this example, the DCI may include not only an indication of the conflict (e.g., as a result of the scheduled downlink/uplink transmission), but also the reclaim indication to allow the UE to reclaim one or more released (unused) PUSCH TOs for transmission of the XR packet.

As another example, the DCI may correspond to a slot format indicator DCI (e.g., DCI Format 2_0) indicating a slot format of one or more slots. In some examples, the slot format may conflict with at least one future PUSCH TO indicated by the UTO-UCI as being expected to be used for transmission of the XR packet. For example, the slot format indicator (SFI) may switch one or more flexible symbols to downlink symbols, thereby preventing the UE 802 from using those symbols for an uplink transmission of the XR packet. In this example, the DCI may include not only an indication of the conflict (e.g., as a result of the SFI), but also the reclaim indication to allow the UE to reclaim one or more released (unused) PUSCH TOs for transmission of the XR packet.

As another example, the DCI may correspond to an uplink cancellation DCI (e.g., DCI Format 2_4) canceling at least one future PUSCH TO indicated by the UTO-UCI as being expected to be used for transmission of the XR packet. The cancellation DCI may sent, for example, in situations where the network entity schedules a higher priority downlink or uplink transmission (or sidelink transmission) for another UE. In this example, the DCI may include not only an indication of the conflict (e.g., as a result of the cancellation indication), but also the reclaim indication to allow the UE to reclaim one or more released (unused) PUSCH TOs for transmission of the XR packet.

As another example, the DCI may correspond to a CG activation DCI (e.g., DCI Format 0_1) activating another CG that conflicts with at least one future PUSCH TO indicated by the UTO-UCI as being expected to be used for transmission of the XR packet. For example, the other CG may be activated for the UE that includes one or more PUSCH TOs that overlap one or more PUSCH TOs of the existing CG. In this example, the DCI may include not only an indication of the conflict (e.g., as a result of the CG activation), but also the reclaim indication to allow the UE to reclaim one or more released (unused) PUSCH TOs for transmission of the XR packet.

As another example, the DCI carrying the reclaim indication may be separate from the DCI indicating the conflict. In this example, the reclaim indication may indicate whether reclaiming a later unused TO is allowed. For example, the network entity 804 may not have reallocated any of the released PUSCH TOs to other transmissions, and therefore, the reclaim indication may apply to any of the previously released PUSCH TOs.

In some examples, the reclaim indication may indicate a specific one of the released PUSCH TOs that may be reclaimed by the UE. For example, the reclaim indication my include a single bit with a Boolean value. In some examples, the single bit parameter may be used to indicate (e.g., by setting the bit to “1” or “true”) whether a particular unused CG PUSCH TO after the reclaim indication may be reclaimed as used (e.g., not unused). In an example, the particular unused CG PUSCH TO that is to be reclaimed may be the first CG PUSCH TO following the reclaim indication. In another example, the particular unused CG PUSCH TO that is to be reclaimed may be the first CG PUSCH TO after a time period from a reference time associated with the reclaim indication. For example, the particular CG PUSCH TO that can be reclaimed may be the first unused CG PUSCH TO that is at least a certain number (X) of symbols, slots, or amount of time (e.g., milliseconds (ms) or other measure of time) after a reclaim indication reference time. The reclaim indication reference time may be, for example, a first symbol carrying the DCI/reclaim indication, a last symbol carrying the DCI/reclaim indication, a first symbol of a slot carrying the DCI/reclaim indication, or a last symbol of the slot carrying the reclaim indication. In some examples, the X value may be configured by the network or reported to the network as part of the UE capability.

As another example, the reclaim indication may include a parameter with an integer value to indicate the particular (e.g., a selected) unused CG PUSCH TO that can be reclaimed by the UE. For example, the integer value may indicate an index of the particular CG PUSCH TO to be reclaimed. As an example, if the UTO-UCI is configured as an eight-bit bitmap, then the integer parameter may have one of eight different values to indicate a specific CG PUSCH TO to be reclaimed (e.g., the parameter may include $\log_2(8)=3$ bits to indicate the CG PUSCH TO).

In other examples, the reclaim indication may indicate multiple ones of the released PUSCH TOs that may be reclaimed by the UE. For example, the reclaim indication my include a single bit with a Boolean value. In some examples, the single bit parameter may be used to indicate (e.g., by setting the bit to "1" or "true") whether subsequent unused CG PUSCH TOs after the reclaim indication may be reclaimed as used (e.g., not unused). In an example, the subsequent unused CG PUSCH TOs that are to be reclaimed immediately follow the reclaim indication. In another example, the subsequent unused CG PUSCH TOs that are to be reclaimed may be the subsequent CG PUSCH TOs after a time period from a reference time associated with the reclaim indication. For example, the first subsequent unused CG PUSCH TO that can be reclaimed may be the first unused CG PUSCH TO that is at least a certain number (X) of symbols, slots, or amount of time (e.g., milliseconds (ms) or other measure of time) after a reclaim indication reference time. The reclaim indication reference time may be, for example, a first symbol carrying the DCI/reclaim indication, a last symbol carrying the DCI/reclaim indication, a first symbol of a slot carrying the DCI/reclaim indication, or a last symbol of the slot carrying the reclaim indication. In some examples, the X value may be configured by the network or reported to the network as part of the UE capability.

As another example, the reclaim indication may include a parameter with an integer value to indicate a number of unused CG PUSCH TOs that can be reclaimed by the UE. For example, with an 8-bit UTO-UCI bitmap, the integer parameter may indicate the first Y CG PUSCH TOs ($Y<=8$) after the reclaim indication are to be reclaimed (e.g., the parameter may include $\log_2(8)=3$ bits to indicate the number of CG PUSCH TOs). In some examples, a timeline constraint may further be added. For example, the integer parameter may indicate the first Y CG PUSCH TOs after a certain number (X) of symbols, slots, or an amount of time (e.g., milliseconds (ms) or other measure of time) from a reclaim indication reference time. As before, the reference time may be, for example, a first symbol carrying the DCI/reclaim indication, a last symbol carrying the DCI/reclaim indication, a first symbol of a slot carrying the DCI/reclaim indication, or a last symbol of the slot carrying the reclaim indication. In some examples, the X value may be configured by the network or reported to the network as part of the UE capability.

As another example, the reclaim indication may include a bitmap indicating at least one selected unused CG PUSCH TO that can be reclaimed by the UE. For example, the bitmap parameter may be used to indicate particular selected unused CG PUSCH TOs to be reclaimed. In an example, with an N-bit UTO-UCI bitmap configured, the parameter may be a bitmap of N−1 bits (with an assumption that there is no need to indicate the first CG PUSCH TO of a cycle). The bitmap of N−1 bits may individually indicate whether each of the N−1 CG PUSCH TOs can be reclaimed.

In some examples, the reclaim indication may further include an offset from a first unused CG PUSCH TO after the reclaim indication. The unused CG PUSCH TO(s) that may then be reclaimed by the UE occur after the offset. For example, the reclaim indication may include a codepoint of multiple bits. One value for the codepoint indicates that the UE does not use any of the unused CG PUSCH TOs for transmission of the XR packet. The other values of the codepoint indicate the offset (in units of CG PUSCH TOs) from the first unused PUSCH TO after the reclaim indication. The offset allows time for the network entity to make the resource(s) of unused CG PUSCH TOs available to the UE (e.g., the network entity may reclaim the resource(s) from other UEs that the network entity has already assigned them to). In some examples, the offset may be applied jointly with other mechanisms above for indicating the one or more unused (released) CG PUSCH TOs that may be reclaimed.

At 814, the UE 802 may then utilize the reclaimed CG PUSCH TO(s) for transmission of the XR packet. In some examples, the UE may further indicate the reclaimed CG PUSCH TO(s) in an additional unused transmission indication (e.g., UTO-UCI). For example, the reclaimed CG PUSCH TO(s) are resources indicated as being unused (released) in a previous UTO-UCI, but then allowed to be reclaimed by the network entity 804 in a received reclaim indication. As such, the UE 802 may then indicate those reclaimed CG PUSCH TO(s) as used (not unused) in an additional UTO-UCI (sent after the reclaim indication). In some examples, the additional UTO-UCI may be included in a PUSCH (e.g., within one of the CG PUSCH TO(s)). The CG PUSCH TO may be a reclaimed CG PUSCH TO or a CG PUSCH TO that occurs after the reclaim indication, but before the reclaimed CG PUSCH TO. In other examples, the additional UTO-UCI may be transmitted separately from a CG PUSCH TO (e.g., within a separate PDCCH or PUSCH). In some examples, the UE may not be able to send a UTO-UCI indicating the reclaimed CG PUSCH TO (e.g., if the reclaimed CG PUSCH TO is the first CG PUSCH TO after the reclaim indication).

Figure 9:
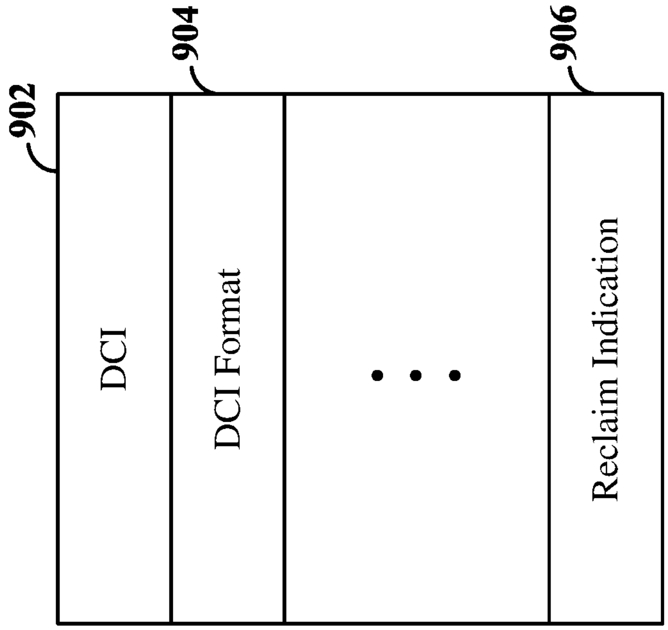
FIG. 9 is a diagram illustrating an example of downlink control information (DCI) carrying a reclaim indication according to some aspects.

FIG. 9 is a diagram illustrating an example of DCI 900 carrying a reclaim indication according to some aspects. The DCI 900 includes a DCI format indicator 902 indicating a DCI format of the DCI. In some examples, the DCI format may correspond to a scheduling DCI or a CG activation DCI. For example, the DCI format may be DCI Format 0_0, DCI Format 0_1, DCI Format 1_0, DCI Format 1_1, DCI Format 3_0, DCI Format 3_1, or other suitable DCI Format. In the example shown in FIG. 9, the DCI 900 is a UEspecific DCI carrying control information for a single UE. The DCI 900 further includes a reclaim indication 904 indicating at least one reclaimed CG PUSCH TO that can be reclaimed by the single UE for transmission of an XR packet.

Figure 10:
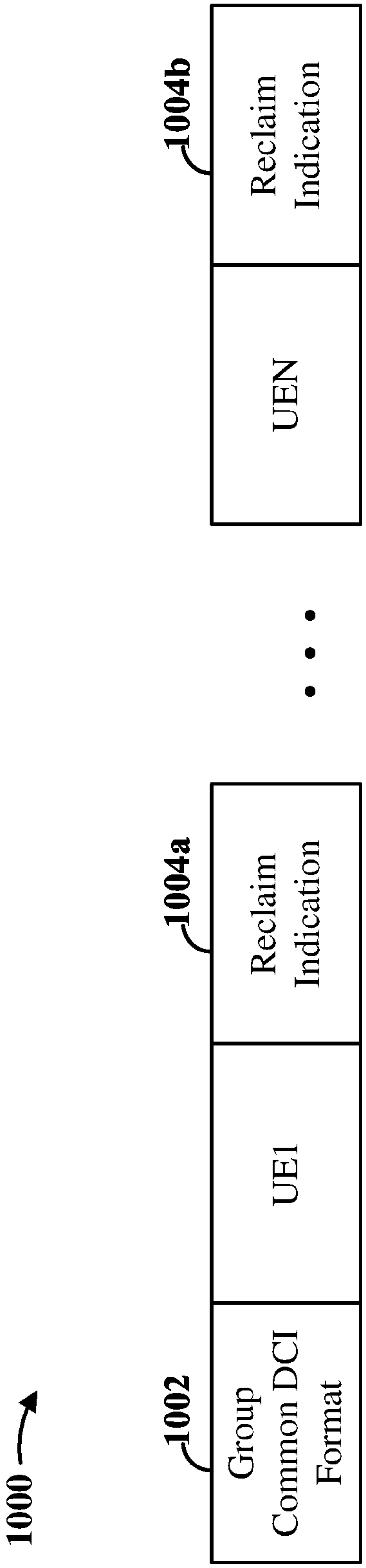
FIG. 10 is a diagram illustrating an example of group common DCI carrying reclaim indications according to some aspects.

FIG. 10 is a diagram illustrating an example of group common DCI carrying reclaim indications according to some aspects. The DCI 1000 includes a DCI format indicator 1002 indicating a DCI format of the DCI. In some examples, the DCI format may correspond to a slot format DCI or a cancellation indication DCI. For example, the DCI format may be DCI Format 2_0, DCI Format 2_4 (e.g., DCI Format 2_4h), or other suitable DCI Format. In the example shown in FIG. 10, the DCI 1000 is a group common DCI carrying control information for a group of UEs. In this example, the DCI 1000 further includes a respective reclaim indication 1004 for each UE field in the group of UEs indicating at least one reclaimed CG PUSCH TO that can be reclaimed by the respective UE for transmission of an XR packet. In examples in which the reclaim indication is not pertinent to one or more of the UEs in the group (e.g., a UE does not have a CG for XR packet transmission or there is no conflict for any of the used CG PUSCH TOs for a UE), the reclaim indication may indicate that the UE is not allowed to reclaim any CG PUSCH TOs.

Figure 11:
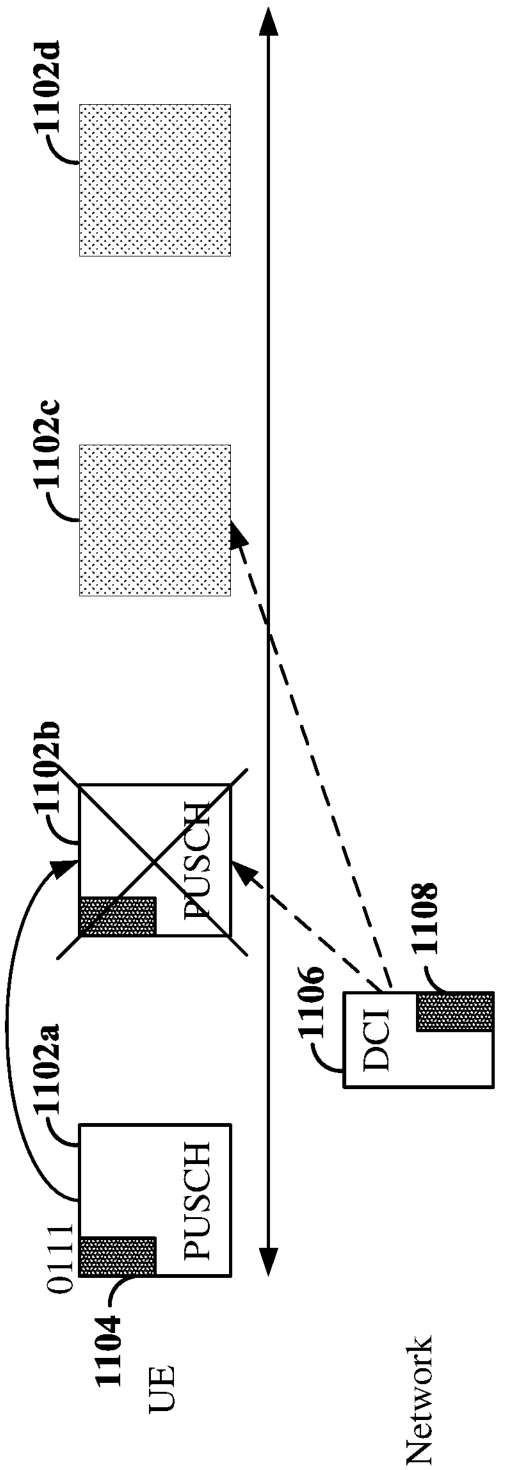
FIG. 11 is a diagram illustrating an example of reclaiming a CG PUSCH TO according to some aspects.

FIG. 11 is a diagram illustrating an example of reclaiming a CG PUSCH TO according to some aspects. FIG. 11 illustrates communications by each of a UE and a network entity (Network) for reclaiming the CG PUSCH TO. In the example shown in FIG. 11, a plurality of CG PUSCH TOs 1102*a*, 1102*b*, 1102*c*, and 1102*d* are shown within a XR packet generation cycle. In a first CG PUSCH TO 1102*a*, the UE may transmit a PUSCH carrying a portion of an XR packet. The first CG PUSCH TO 1102*a* may further include UTO-UCI 1104 (e.g., 0 0 1 1) releasing the third and fourth CG PUSCH TOs 1102*c* and 1102*d*. However, prior to the second CG PUSCH TO 1102*b*, the network entity may provide DCI 1106, which may be, for example, a scheduling DCI, a SFI DCI, an uplink cancellation DCI, or a CG activation DCI that indicates a conflict with the second CG PUSCH TO 1102*b*. Thus, transmission of the remainder of the XR packet is canceled within the second CG PUSCH TO 1102*b*. The DCI 1106 may further carry a reclaim indication 1108 indicating that the third CG PUSCH TO 1102*c* may be reclaimed by the UE for transmission of the remainder of the XR packet.

Figure 12:
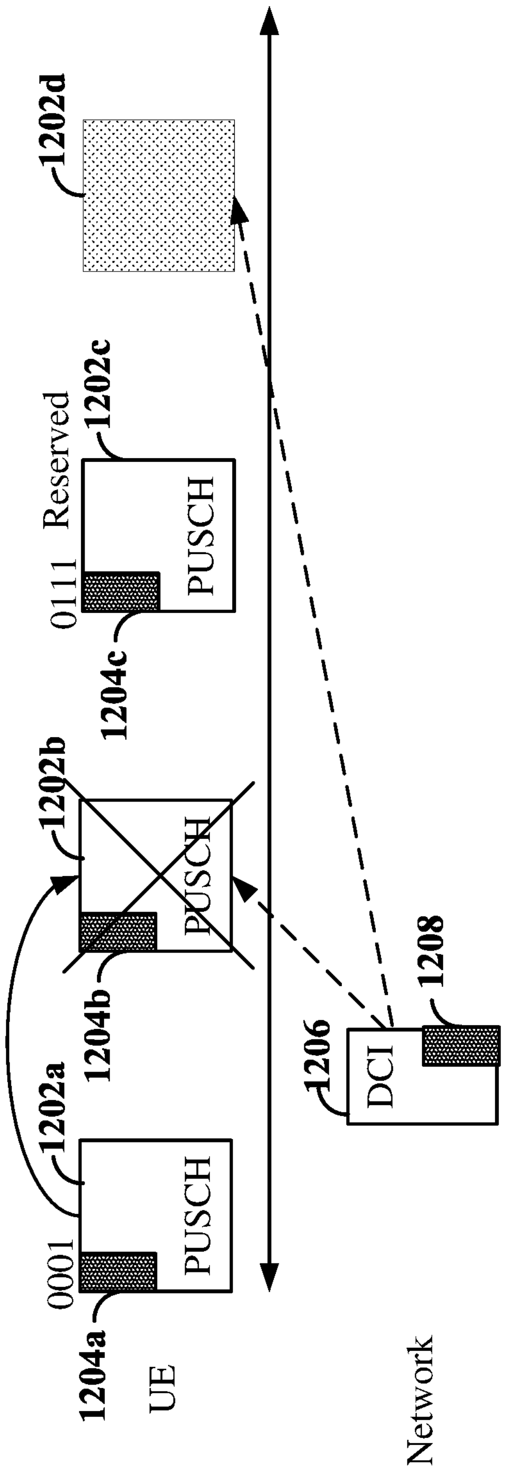
FIG. 12 is a diagram illustrating another example of reclaiming a CG PUSCH TO according to some aspects.

FIG. 12 is a diagram illustrating another example of reclaiming a CG PUSCH TO according to some aspects. FIG. 12 again illustrates communications by each of a UE and a network entity (Network) for reclaiming the CG PUSCH TO. In the example shown in FIG. 12, a plurality of CG PUSCH TOs 1202*a*, 1202*b*, 1202*c*, and 1202*d* are shown within a XR packet generation cycle. In a first CG PUSCH TO 1202*a*, the UE may transmit a PUSCH carrying a portion of an XR packet. The first CG PUSCH TO 1202*a* may further include UTO-UCI 1204*a* (e.g., 0 0 0 1) releasing the fourth CG PUSCH TO 1202*d*. However, prior to the second CG PUSCH TO 1202*b*, the network entity may provide DCI 1206, which may be, for example, a scheduling DCI, a SFI DCI, an uplink cancellation DCI, or a CG activation DCI that indicates a conflict with the second CG PUSCH TO 1202*b*. Thus, transmission of the remainder of the XR packet, along with an associated UTO-UCI 1204*b*, is canceled within the second CG PUSCH TO 1202*b*. The DCI 1206 may further carry a reclaim indication 1208 indicating that the fourth CG PUSCH TO 1102*d* may be reclaimed by the UE for transmission of the remainder of the XR packet.

As further shown in the example of FIG. 12, in the third CG PUSCH TO 1202*c*, the UE may transmit another portion of the XR packet, along with additional UTO-UCI 1204*c* (e.g., 0 1 1 1) indicating that the fourth CG PUSCH TO 1202*d* is a reclaimed CG PUSCH TO within which the UE may transmit the remaining portion of the XR packet.

Figure 13:
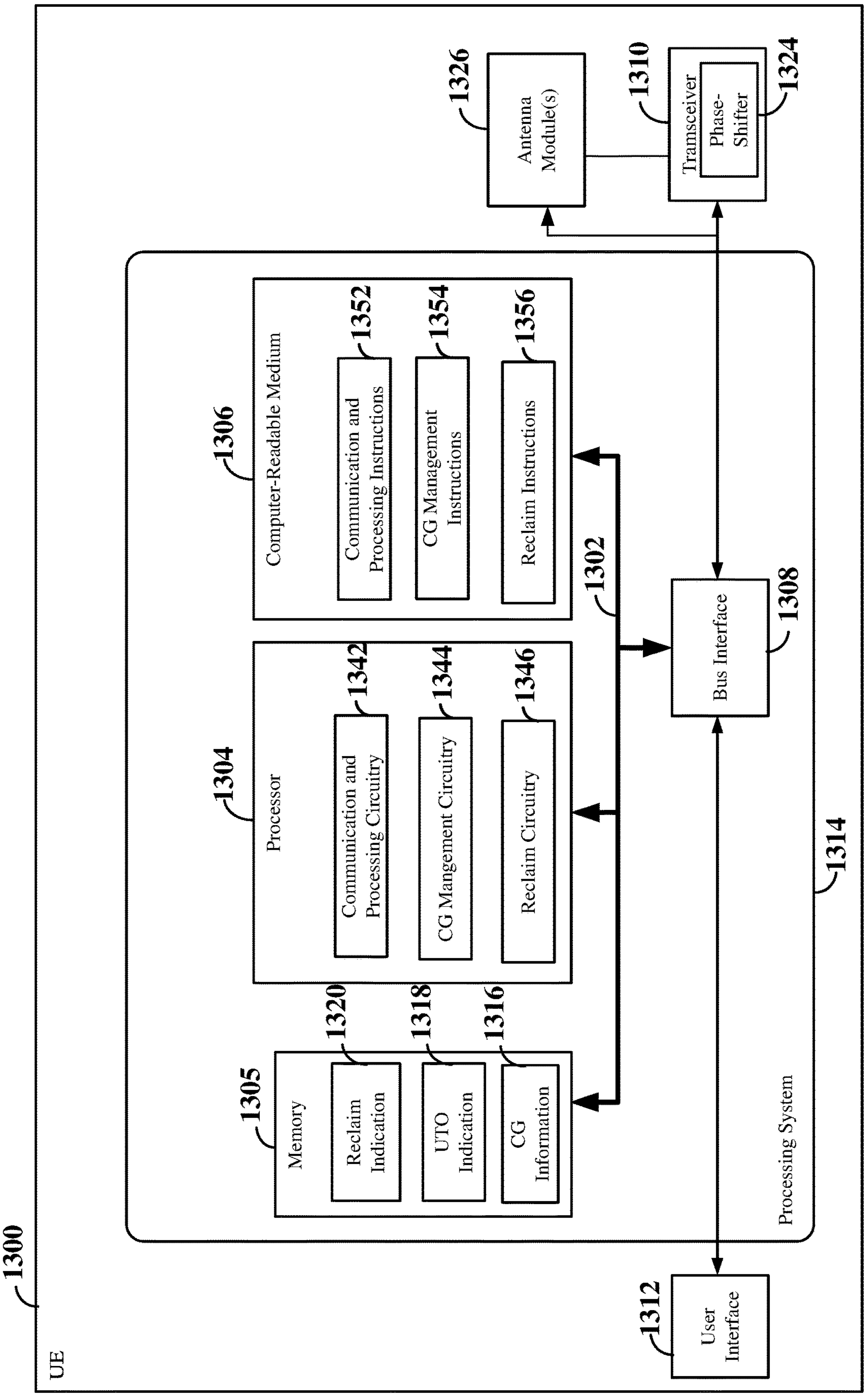
FIG. 13 is a block diagram illustrating an example of a hardware implementation for a wireless communication device employing a processing system according to some aspects.

FIG. 13 is a block diagram illustrating an example of a hardware implementation of a user equipment (UE) 1300 employing a processing system 1314 according to some aspects. For example, the UE 1300 may correspond to any of the UEs shown and described above in reference to FIGS. 1, 3-5, and/or 8.

In accordance with various aspects of the disclosure, an element, or any portion of an element, or any combination of elements may be implemented with a processing system 1314 that includes one or more processors, such as processor 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in the UE 1300, may be used to implement any one or more of the methods or processes described and illustrated, for example, in FIGS. 8 and/or 14.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits, including one or more processors (represented generally by the processor 1304), one or more memories (represented generally by the memory 1305), and one or more computer-readable media (represented generally by the computer-readable medium 1306). In some examples, the computer-readable media 1306 may be included within or part of one or more of the memories 1305. The bus 1302 may also link various other circuits such as timing sources, peripherals, voltage regulators, and power management circuits, which are well known in the art, and therefore, are not described any further.

A bus interface 1308 provides an interface between the bus 1302, one or more transceivers 1310, and one or more antenna modules (e.g., one or more antenna arrays or panels) 1326. The transceiver 1310 and antenna module(s) 1326 provides a means for communicating with various other apparatus over a transmission medium (e.g., air interface). The bus interface 1308 further provides an interface between the bus 1302 and a user interface 1312 (e.g., keypad, display, touch screen, speaker, microphone, control features, etc.). Of course, such a user interface 1312 may be omitted in some examples.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system. In some examples, the computer-readable medium 1306 may be implemented on an article of manufacture, which may further include one or more other elements or circuits, such as the processor 1304 and/or memory 1305.

The computer-readable medium 1306 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1304, may be responsible for managing the bus 1302 and general processing, including the execution of the software (e.g., instructions or computer-executable code) stored on the computer-readable medium 1306. The software, when executed by the processor 1304, causes the processing system 1314 to perform the various processes and functions described herein for any particular apparatus. The computer-readable medium 1306 and/or the memory 1305 may also be used for storing data that may be manipulated by the processor 1304 when executing software. For example, the memory 1305 may store one or more of configured grant (CG) information 1316, UTO indication(s) 1318, and/or a reclaim indication 1320.

In some aspects of the disclosure, the processor 1304 may include circuitry configured for various functions. For example, the processor 1304 may include communication and processing circuitry 1342 configured to communicate with one or more UEs and/or one or more network entities. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains.

In some implementations where the communication involves receiving information, the communication and processing circuitry 1342 may obtain information from a component of the UE 1300 (e.g., from the transceiver 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for demodulating, a means for decoding, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the transceiver 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

In some examples, the communication and processing circuitry 1342 may be configured to receive and process downlink beamformed signals at a mmWave frequency or a sub-6 GHz frequency via the transceiver 1310 and the antenna module(s) 1326 (e.g., using a phase-shifter 1324). In addition, the communication and processing circuitry 1342 may be configured to generate and transmit uplink beamformed signals at a mmWave frequency or a sub-6 GHz frequency via the transceiver 1310 and antenna module(s) 1326 (e.g., using the phase-shifter 1324).

In some examples, the communication and processing circuitry 1342 may be configured to transmit via the transceiver 1310 an unused transmission occasion (UTO) indication (e.g., UTO-UCI) 1318 to a network entity, such as a gNB, or other aggregated or disaggregated base station. The UTO indication 1318 releases one or more unused transmission occasions (TOs) of a plurality of future configured grant (CG) physical uplink shared channel (PUSCH) TOs configured for transmission of a packet, such as an extended reality (XR) packet or other type of packet associated with a CG. The communication and processing circuitry 1342 may further be configured to receive via the transceiver 1310 a reclaim indication 1320 from the network entity. The reclaim indication 1320 indicates at least one reclaimed TO of the one or more unused TOs that can be reclaimed by the UE for transmission of the packet.

In some examples, the communication and processing circuitry 1342 may be configured to receive via the transceiver 1310 downlink control information (DCI) including the reclaim indication 1320. In some examples, the DCI is a scheduling DCI scheduling an uplink transmission or a downlink transmission conflicting with at least one used TO of the plurality of future CG PUSCH TOs planned to be used by the UE for transmission of the packet. In some examples, the DCI is a slot format indicator DCI indicating a slot format of one or more slots, the slot format conflicting with at least one used TO of the plurality of future CG PUSCH TOs planned to be used by the UE for transmission of the packet. In some examples, the DCI is an uplink cancellation DCI canceling at least one used TO of the plurality of future CG PUSCH TOs planned to be used by the UE for transmission of the packet. In some examples, the DCI is a CG activation DCI activating a CG that conflicts with at least one used TO of the plurality of future CG PUSCH TOs planned to be used by the UE for transmission of the packet. In some examples, the DCI includes a single field carrying the reclaim indication. In some examples, the DCI is UE group common DCI. The UE group common DCI may include a respective sub-field carrying a respective reclaim indication in each UE field of the UE group common DCI.

In some examples, the communication and processing circuitry 1342 may further be configured to transmit via the transceiver 1310 an additional UTO indication 1318 to the network entity. The additional UTO indication 1318 reclaims the at least one reclaimed TO as a used TO for transmission of the packet. The communication and processing circuitry 1342 may further be configured to generate and transmit the packet via one or more used (not unused) CG PUSCH TOs. The communication and processing circuitry 1342 may further be configured to execute communication and processing software 1352 stored on the computer-readable medium 1306 to implement one or more functions described herein.

The processor 1304 may further include CG management circuitry 1344, configured to manage the CG for transmission of the packet. In some examples, the CG management circuitry 1344 may be configured to receive, together with the communication and processing circuitry 1342, CG information 1316 and to store the CG information 1316 within, for example, the memory 1305. The CG information 1316 may include, for example, one or more CG parameters received via an SPS configuration of the CG and a CG activation message. The SPS configuration may include, for example, an indication of allocated resources for the CG, a semi-persistent scheduling identifier (e.g., an SPS-RNTI) for the UE 1300 and a periodicity of the CG. The SPS activation message may further provide additional CG parameters, including, for example, an implicit release time, cyclic shift DMRS configuration, modulation and coding scheme (MCS) and/or other parameters. The CG management circuitry 1344 may further be configured to utilize the CG information 1316 to instruct the communication and processing circuitry 1342 on available resources (e.g., CG PUSCH TOs) for transmission of the packet.

The CG management circuitry 1344 may further be configured to generate the UTO indication 1318 based on real-time generation and processing of the packet (e.g., by the communication and processing circuitry 1342). In addition, the CG management circuitry 1344 may further be configured to generate the additional UTO 1318 based on the reclaim indication 1320 and real-time generation and processing of the packet (e.g., by the communication and processing circuitry 1342). The CG management circuitry 1344 may further be configured to execute CG management instructions (software) 1354 stored on the computer-readable medium 1306 to implement one or more functions described herein.

The processor 1304 may further include reclaim circuitry 1346, configured to receive and process the reclaim indication 1320. In some examples, the reclaim indication includes a single bit with a Boolean value indicating whether a first unused TO of the one or more unused TOs after the reclaim indication or after a time period from a reference time associated with the reclaim indication can be reclaimed by the UE as the at least one reclaimed TO. In some examples, the reclaim indication includes a single bit with a Boolean value indicating whether each unused TO of the one or more TOs after the reclaim indication or after a time period from a reference time associated with the reclaim indication can be reclaimed by the UE as the at least one reclaimed TO. In some examples, the time period corresponds to a number of symbols, a number of slots, or an amount of time and the reference time corresponds to a first symbol carrying the reclaim indication, a last symbol carrying the reclaim indication, a first symbol of a slot carrying the reclaim indication, or a last symbol of the slot carrying the reclaim indication.

In some examples, the reclaim indication includes a parameter with an integer value to indicate a selected unused TO of the one or more unused TOs that can be reclaimed by the UE as the at least one reclaimed TO. In some examples, the reclaim indication includes a parameter with an integer value to indicate a number of unused TOs of the one or more unused TOs after the reclaim indication or after a time period from a reference time associated with the reclaim indication that can be reclaimed by the UE as the at least one reclaimed TO.

In some examples, the reclaim indication includes a bitmap indicating at least one selected unused TO of the one or more unused TO that can be reclaimed by the UE as the at least one reclaimed TO. In some examples, the reclaim indication includes an offset from a first unused TO of the one or more unused TOs after the reclaim indication, wherein the at least one reclaimed TO occurs after the offset.

The reclaim circuitry 1346 may further be configured to operate together with the CG management circuitry 1344 to instruct the communication and processing circuitry 1342 on available future CG PUSCH TOs for transmission of the packet based on the reclaim indication 1320. The reclaim circuitry 1346 may further be configured to execute reclaim instructions (software) 1356 stored on the computer-readable medium 1306 to implement one or more functions described herein.

Figure 14:
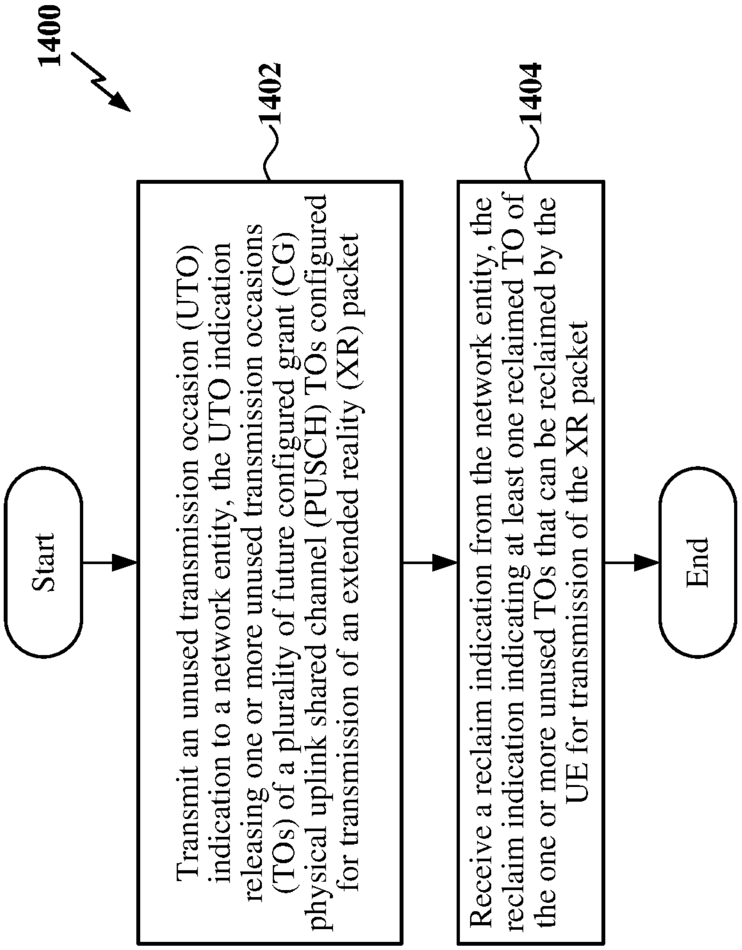
FIG. 14 is a flow chart illustrating an exemplary process for reclaiming CG PUSCH TOs according to some aspects.

FIG. 14 is a flow chart illustrating an exemplary process 1400 for reclaiming CG PUSCH TOs according to some aspects. As described below, some or all illustrated features may be omitted in a particular implementation within the scope of the present disclosure, and some illustrated features may not be required for implementation of all embodiments. In some examples, the process 1400 may be carried out by the UE 1300 illustrated in FIG. 13. In some examples, the process 1700 may be carried out by any suitable apparatus or means for carrying out the functions or algorithm described below.

At block 1402, the UE may transmit an unused transmission occasion (UTO) indication to a network entity. The UTO indication releases one or more unused transmission occasions (TOs) of a plurality of future configured grant (CG) physical uplink shared channel (PUSCH) TOs configured for transmission of a packet. For example, the communication and processing circuitry 1342, in combination with the CG management circuitry 1344 and transceiver 1310, shown and described above in connection with FIG. 13 may provide a means to transmit the UTO indication.

At block 1404, the UE may receive a reclaim indication from the network entity. The reclaim indication indicates at least one reclaimed TO of the one or more unused TOs that can be reclaimed by the UE for transmission of the packet. For example, the communication and processing circuitry 1342, in combination with the reclaim circuitry 1346 and transceiver 1310, shown and described above in connection with FIG. 13 may provide a means to receive the reclaim indication.

In some examples, the UE may receive downlink control information (DCI) including the reclaim indication. In some examples, the DCI includes a scheduling DCI scheduling an uplink transmission or a downlink transmission conflicting with at least one used TO of the plurality of future CG PUSCH TOs planned to be used by the UE for transmission of the packet. In some examples, the DCI includes a slot format indicator DCI indicating a slot format of one or more slots, the slot format conflicting with at least one used TO of the plurality of future CG PUSCH TOs planned to be used by the UE for transmission of the packet. In some examples, the DCI includes an uplink cancellation DCI canceling at least one used TO of the plurality of future CG PUSCH TOs planned to be used by the UE for transmission of the packet. In some examples, the DCI includes a CG activation DCI activating a CG that conflicts with at least one used TO of the plurality of future CG PUSCH TOs planned to be used by the UE for transmission of the packet. In some examples, the DCI includes a single field carrying the reclaim indication. In some examples, the DCI includes UE group common DCI including a respective sub-field carrying a respective reclaim indication in each UE field of the UE group common DCI.

In some examples, the reclaim indication includes a single bit with a Boolean value indicating whether a first unused TO of the one or more unused TOs after the reclaim indication or after a time period from a reference time associated with the reclaim indication can be reclaimed by the UE as the at least one reclaimed TO. In some examples, the reclaim indication includes a single bit with a Boolean value indicating whether each unused TO of the one or more TOs after the reclaim indication or after a time period from a reference time associated with the reclaim indication can be reclaimed by the UE as the at least one reclaimed TO. In some examples, the time period corresponds to a number of symbols, a number of slots, or an amount of time and the reference time corresponds to a first symbol carrying the reclaim indication, a last symbol carrying the reclaim indication, a first symbol of a slot carrying the reclaim indication, or a last symbol of the slot carrying the reclaim indication.

In some examples, the reclaim indication includes a parameter with an integer value to indicate a selected unused TO of the one or more unused TOs that can be reclaimed by the UE as the at least one reclaimed TO. In some examples, the reclaim indication includes a parameter with an integer value to indicate a number of unused TOs of the one or more unused TOs after the reclaim indication or after a time period from a reference time associated with the reclaim indication that can be reclaimed by the UE as the at least one reclaimed TO.

In some examples, the reclaim indication includes a bitmap indicating at least one selected unused TO of the one or more unused TO that can be reclaimed by the UE as the at least one reclaimed TO. In some examples, the reclaim indication includes an offset from a first unused TO of the one or more unused TOs after the reclaim indication, wherein the at least one reclaimed TO occurs after the offset.

In one configuration, the UE includes means for transmitting an unused transmission occasion (UTO) indication to a network entity, the UTO indication releasing one or more unused transmission occasions (TOs) of a plurality of future configured grant (CG) physical uplink shared channel (PUSCH) TOs configured for transmission of a packet and means for receiving a reclaim indication from the network entity, the reclaim indication indicating at least one reclaimed TO of the one or more unused TOs that can be reclaimed by the UE for transmission of the packet. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3-5, 8, and/or 13, and utilizing, for example, the processes and/or algorithms described herein in relation to FIGS. 8 and/or 14.

Figure 15:
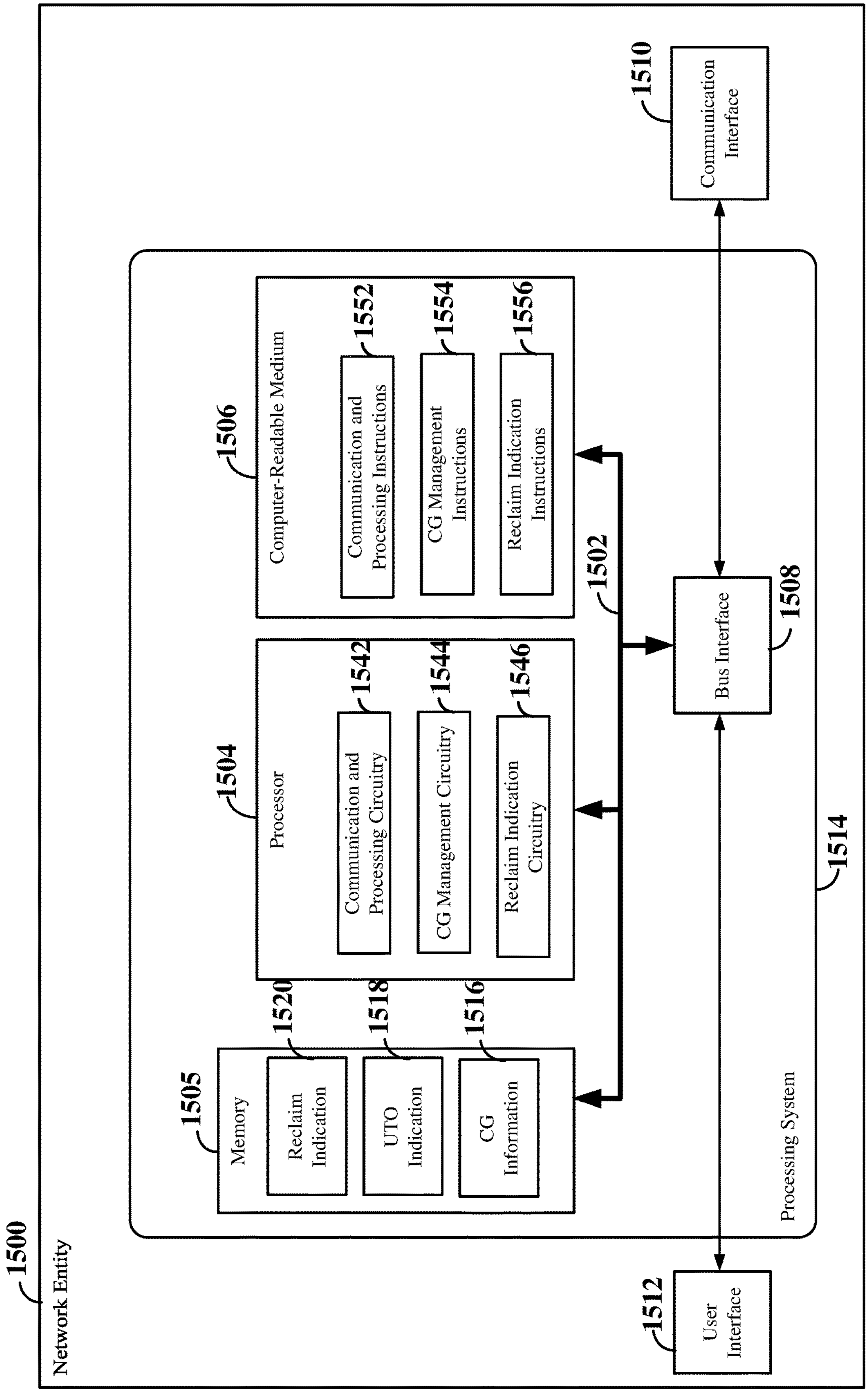
FIG. 15 is a block diagram illustrating an example of a hardware implementation for a network entity employing a processing system according to some aspects.

FIG. 15 is a block diagram illustrating an example of a hardware implementation of a network entity 1500 employing a processing system 1514 according to some aspects. The network entity 1500 may be, for example, a network entity or other network node illustrated in any one or more of FIGS. 1, 3, 4, and/or 11-15. For example, the network entity may be a base station (e.g., gNB, eNB) or other scheduling entity as illustrated in any one or more of FIGS. 1 and/or 3. A network entity may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, a network entity may be a stationary network entity or a mobile network entity.

In accordance with various aspects of the disclosure, an element, or any portion of an element, or any combination of elements may be implemented with a processing system 1514 that includes one or more processors, such as processor 1504. The processing system 1514 may be substantially the same as the processing system 1614 as shown and described above in connection with FIG. 16, including a bus interface 1508, a bus 1502, a memory 1505 (e.g., one or more memories), a processor 1504 (e.g., one or more processors), and a computer-readable medium 1506 (e.g., one or more computer-readable mediums). Accordingly, their descriptions will not be repeated for the sake of brevity. Furthermore, the network entity 1500 may include an optional user interface 1512 and a communication interface 1510 (e.g., wired or wireless), such as one or more transceivers or one or more network interfaces.

The processor 1504, as utilized in the network entity 1500, may be used to implement any one or more of the processes described below. In some examples, the memory 1505 may store CG information 1516, UTO indication(s) 1518, and/or reclaim indication(s) 1520.

In some aspects of the disclosure, the processor 1504 may include communication and processing circuitry 1542 configured for various functions, including, for example, communicating with one or more wireless communication devices (e.g., UEs), a core network node, or other network entity. In some examples (e.g., in an aggregated base station architecture), the communication and processing circuitry 1542 may include one or more hardware components that provide the physical structure that performs processes related to wireless communication (e.g., signal reception and/or signal transmission) and/or signal processing (e.g., processing a received signal and/or processing a signal for transmission). In addition, the communication and processing circuitry 1542 may be configured to process and transmit downlink traffic and downlink control and receive and process uplink traffic and uplink control.

In some examples, the communication and processing circuitry 1542 may be configured to obtain via the communication interface 1510 an unused transmission occasion (UTO) indication (e.g., UTO-UCI) 1518 from a UE. The UTO indication 1518 releases one or more unused transmission occasions (TOs) of a plurality of future configured grant (CG) physical uplink shared channel (PUSCH) TOs configured for transmission of a packet, such as an extended reality (XR) packet or other type of packet associated with a CG. The communication and processing circuitry 1542 may further be configured to provide via the communication interface 1510 a reclaim indication 1520 for the UE. The reclaim indication 1520 indicates at least one reclaimed TO of the one or more unused TOs that can be reclaimed by the UE for transmission of the packet.

In some examples, the communication and processing circuitry 1542 may be configured to provide via the communication interface 1510 downlink control information (DCI) including the reclaim indication 1520. In some examples, the DCI is a scheduling DCI scheduling an uplink transmission or a downlink transmission conflicting with at least one used TO of the plurality of future CG PUSCH TOs planned to be used by the UE for transmission of the packet. In some examples, the DCI is a slot format indicator DCI indicating a slot format of one or more slots, the slot format conflicting with at least one used TO of the plurality of future CG PUSCH TOs planned to be used by the UE for transmission of the packet. In some examples, the DCI is an uplink cancellation DCI canceling at least one used TO of the plurality of future CG PUSCH TOs planned to be used by the UE for transmission of the packet. In some examples, the DCI is a CG activation DCI activating a CG that conflicts with at least one used TO of the plurality of future CG PUSCH TOs planned to be used by the UE for transmission of the packet. In some examples, the DCI includes a single field carrying the reclaim indication. In some examples, the DCI is UE group common DCI. The UE group common DCI may include a respective sub-field carrying a respective reclaim indication in each UE field of the UE group common DCI.

In some examples, the communication and processing circuitry 1542 may further be configured to obtain via the communication interface 1510 an additional UTO indication 1518 from the UE. The additional UTO indication 1518 reclaims the at least one reclaimed TO as a used TO for transmission of the packet. The communication and processing circuitry 1542 may further be configured to obtain the packet via one or more used (not unused) CG PUSCH TOs. The communication and processing circuitry 1542 may further be configured to execute communication and processing software 1552 stored on the computer-readable medium 1506 to implement one or more functions described herein.

The processor 1504 may further include CG management circuitry 1544, configured to manage the CG for the UE. In some examples, the CG management circuitry 1544 may be configured to provide, together with the communication and processing circuitry 1542, CG information 1516 and to store the CG information 1516 within, for example, the memory 1505. The CG information 1516 may include, for example, one or more CG parameters received via an SPS configuration of the CG and a CG activation message. The SPS configuration may include, for example, an indication of allocated resources for the CG, a semi-persistent scheduling identifier (e.g., an SPS-RNTI) for the UE and a periodicity of the CG. The SPS activation message may further provide additional CG parameters, including, for example, an implicit release time, cyclic shift DMRS configuration, modulation and coding scheme (MCS) and/or other parameters. The CG management circuitry 1544 may further be configured to execute CG management instructions (software) 1554 stored on the computer-readable medium 1506 to implement one or more functions described herein.

The processor 1504 may further include reclaim circuitry 1546, configured to generate and provide the reclaim indication 1520 (e.g., based on a scheduling conflict with one or more CG PUSCH TOs indicated as being used by the UE for transmission of the packet). In some examples, the reclaim indication includes a single bit with a Boolean value indicating whether a first unused TO of the one or more unused TOs after the reclaim indication or after a time period from a reference time associated with the reclaim indication can be reclaimed by the UE as the at least one reclaimed TO. In some examples, the reclaim indication includes a single bit with a Boolean value indicating whether each unused TO of the one or more TOs after the reclaim indication or after a time period from a reference time associated with the reclaim indication can be reclaimed by the UE as the at least one reclaimed TO. In some examples, the time period corresponds to a number of symbols, a number of slots, or an amount of time and the reference time corresponds to a first symbol carrying the reclaim indication, a last symbol carrying the reclaim indication, a first symbol of a slot carrying the reclaim indication, or a last symbol of the slot carrying the reclaim indication.

In some examples, the reclaim indication includes a parameter with an integer value to indicate a selected unused TO of the one or more unused TOs that can be reclaimed by the UE as the at least one reclaimed TO. In some examples, the reclaim indication includes a parameter with an integer value to indicate a number of unused TOs of the one or more unused TOs after the reclaim indication or after a time period from a reference time associated with the reclaim indication that can be reclaimed by the UE as the at least one reclaimed TO.

In some examples, the reclaim indication includes a bitmap indicating at least one selected unused TO of the one or more unused TO that can be reclaimed by the UE as the at least one reclaimed TO. In some examples, the reclaim indication includes an offset from a first unused TO of the one or more unused TOs after the reclaim indication, wherein the at least one reclaimed TO occurs after the offset. The reclaim circuitry 1546 may further be configured to execute reclaim instructions (software) 1556 stored on the computer-readable medium 1506 to implement one or more functions described herein.

Figure 16:
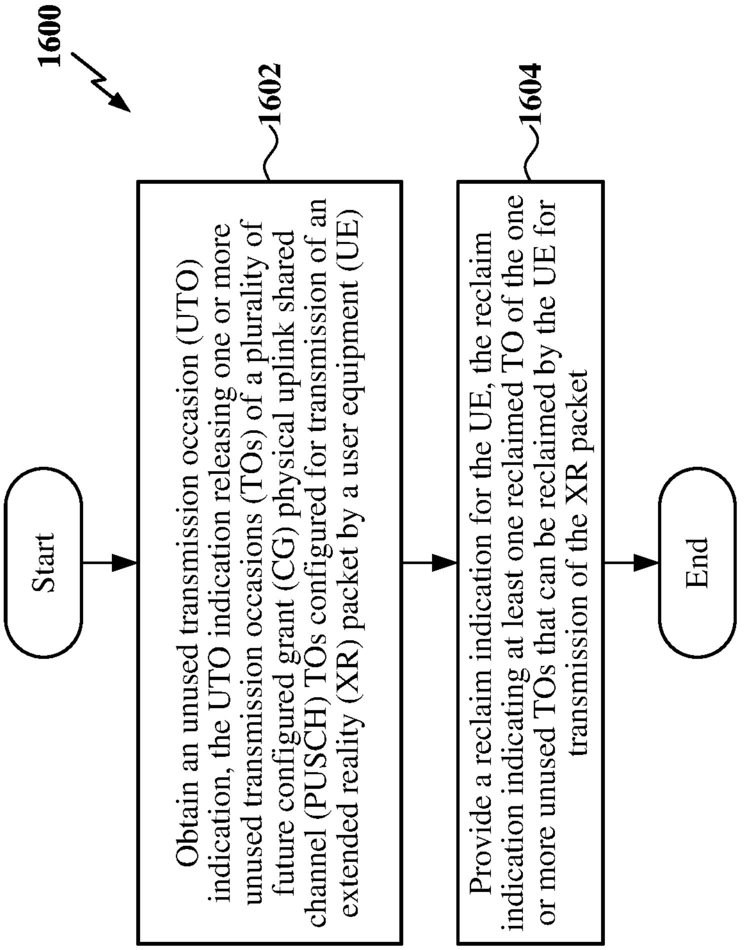
FIG. 16 is a flow chart illustrating another exemplary process for reclaiming CG PUSCH TOs according to some aspects.

FIG. 16 is a flow chart illustrating another exemplary process 1600 for reclaiming CG PUSCH TOs according to some aspects. As described below, some or all illustrated features may be omitted in a particular implementation within the scope of the present disclosure, and some illustrated features may not be required for implementation of all embodiments. In some examples, the process 1600 may be carried out by the network entity 1500 illustrated in FIG. 15. In some examples, the process 1600 may be carried out by any suitable apparatus or means for carrying out the functions or algorithm described below.

At block 1602, the network entity may obtain an unused transmission occasion (UTO) indication. The UTO indication releases one or more unused transmission occasions (TOs) of a plurality of future configured grant (CG) physical uplink shared channel (PUSCH) TOs configured for transmission of a packet by a user equipment (UE). For example, the communication and processing circuitry 1542, together with the communication interface 1510, shown and described above in connection with FIG. 15 may provide a means to obtain the UTO indication.

At block 1604, the network entity may provide a reclaim indication indicating at least one reclaimed TO of the one or more unused TOs that can be reclaimed by the UE for transmission of the packet. For example, the communication and processing circuitry 1542, together with the reclaim circuitry 1546 and communication interface 1510, shown and described above in connection with FIG. 15 may provide a means to provide the reclaim indication.

In some examples, the network entity may provide downlink control information (DCI) including the reclaim indication. In some examples, the DCI includes a scheduling DCI scheduling an uplink transmission or a downlink transmission conflicting with at least one used TO of the plurality of future CG PUSCH TOs planned to be used by the UE for transmission of the packet. In some examples, the DCI includes a slot format indicator DCI indicating a slot format of one or more slots, the slot format conflicting with at least one used TO of the plurality of future CG PUSCH TOs planned to be used by the UE for transmission of the packet. In some examples, the DCI includes an uplink cancellation DCI canceling at least one used TO of the plurality of future CG PUSCH TOs planned to be used by the UE for transmission of the packet. In some examples, the DCI includes a CG activation DCI activating a CG that conflicts with at least one used TO of the plurality of future CG PUSCH TOs planned to be used by the UE for transmission of the packet. In some examples, the DCI includes a single field carrying the reclaim indication. In some examples, the DCI includes UE group common DCI including a respective sub-field carrying a respective reclaim indication in each UE field of the UE group common DCI.

In some examples, the reclaim indication includes a single bit with a Boolean value indicating whether a first unused TO of the one or more unused TOs after the reclaim indication or after a time period from a reference time associated with the reclaim indication can be reclaimed by the UE as the at least one reclaimed TO. In some examples, the reclaim indication includes a single bit with a Boolean value indicating whether each unused TO of the one or more TOs after the reclaim indication or after a time period from a reference time associated with the reclaim indication can be reclaimed by the UE as the at least one reclaimed TO. In some examples, the time period corresponds to a number of symbols, a number of slots, or an amount of time and the reference time corresponds to a first symbol carrying the reclaim indication, a last symbol carrying the reclaim indication, a first symbol of a slot carrying the reclaim indication, or a last symbol of the slot carrying the reclaim indication.

In some examples, the reclaim indication includes a parameter with an integer value to indicate a selected unused TO of the one or more unused TOs that can be reclaimed by the UE as the at least one reclaimed TO. In some examples, the reclaim indication includes a parameter with an integer value to indicate a number of unused TOs of the one or more unused TOs after the reclaim indication or after a time period from a reference time associated with the reclaim indication that can be reclaimed by the UE as the at least one reclaimed TO.

In some examples, the reclaim indication includes a bitmap indicating at least one selected unused TO of the one or more unused TO that can be reclaimed by the UE as the at least one reclaimed TO. In some examples, the reclaim indication includes an offset from a first unused TO of the one or more unused TOs after the reclaim indication, wherein the at least one reclaimed TO occurs after the offset.

In one configuration, the network entity includes means for obtaining an unused transmission occasion (UTO) indication, the UTO indication releasing one or more unused transmission occasions (TOs) of a plurality of future configured grant (CG) physical uplink shared channel (PUSCH) TOs configured for transmission of an extended reality (XR) packet by a user equipment (UE) and means for providing a reclaim indication indicating at least one reclaimed TO of the one or more unused TOs that can be reclaimed by the UE for transmission of the packet. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3-5, 8, and/or 15, and utilizing, for example, the processes and/or algorithms described herein in relation to FIGS. 8 and/or 16.

The following provides an overview of aspects of the present disclosure:

Aspect 1: A method operable at a user equipment (UE), the method comprising: transmitting an unused transmission occasion (UTO) indication to a network entity, the UTO indication releasing one or more unused transmission occasions (TOs) of a plurality of future configured grant (CG) physical uplink shared channel (PUSCH) TOs configured for transmission of a packet; and receiving a reclaim indication from the network entity, the reclaim indication indicating at least one reclaimed TO of the one or more unused TOs that can be reclaimed by the UE for transmission of the packet.

Aspect 2: The method of aspect 1, further comprising: receiving downlink control information (DCI) comprising the reclaim indication.

Aspect 3: The method of aspect 2, wherein the DCI comprises a scheduling DCI scheduling an uplink transmission or a downlink transmission conflicting with at least one used TO of the plurality of future CG PUSCH TOs planned to be used by the UE for transmission of the packet.

Aspect 4: The method of aspect 2, wherein the DCI comprises a slot format indicator DCI indicating a slot format of one or more slots, the slot format conflicting with at least one used TO of the plurality of future CG PUSCH TOs planned to be used by the UE for transmission of the packet.

Aspect 5: The method of aspect 2, wherein the DCI comprises an uplink cancellation DCI canceling at least one used TO of the plurality of future CG PUSCH TOs planned to be used by the UE for transmission of the packet.

Aspect 6: The method of aspect 2, wherein the DCI comprises a CG activation DCI activating a CG that conflicts with at least one used TO of the plurality of future CG PUSCH TOs planned to be used by the UE for transmission of the packet.

Aspect 7: The method of aspect 2, wherein the DCI comprises a single field carrying the reclaim indication.

Aspect 8: The method of aspect 2, wherein the DCI comprises UE group common DCI, and wherein the UE group common DCI comprises a respective sub-field carrying a respective reclaim indication in each UE field of the UE group common DCI.

Aspect 9: The method of any of aspects 1 through 8, wherein the reclaim indication comprises a single bit with a Boolean value indicating whether a first unused TO of the one or more unused TOs after the reclaim indication or after a time period from a reference time associated with the reclaim indication can be reclaimed by the UE as the at least one reclaimed TO.

Aspect 10: The method of aspect 9, wherein the time period comprises a number of symbols, a number of slots, or an amount of time and the reference time comprises a first symbol carrying the reclaim indication, a last symbol carrying the reclaim indication, a first symbol of a slot carrying the reclaim indication, or a last symbol of the slot carrying the reclaim indication.

Aspect 11: The method of any of aspects 1 through 8, wherein the reclaim indication comprises a parameter with an integer value to indicate a selected unused TO of the one or more unused TOs that can be reclaimed by the UE as the at least one reclaimed TO.

Aspect 12: The method of any of aspects 1 through 8, wherein the reclaim indication comprises a single bit with a Boolean value indicating whether each unused TO of the one or more TOs after the reclaim indication or after a time period from a reference time associated with the reclaim indication can be reclaimed by the UE as the at least one reclaimed TO.

Aspect 13: The method of any of aspects 1 through 8, wherein the reclaim indication comprises a parameter with an integer value to indicate a number of unused TOs of the one or more unused TOs after the reclaim indication or after a time period from a reference time associated with the reclaim indication that can be reclaimed by the UE as the at least one reclaimed TO.

Aspect 14: The method of any of aspects 1 through 8, wherein the reclaim indication comprises a bitmap indicating at least one selected unused TO of the one or more unused TO that can be reclaimed by the UE as the at least one reclaimed TO.

Aspect 15: The method of any of aspects 1 through 14, wherein the reclaim indication comprises an offset from a first unused TO of the one or more unused TOs after the reclaim indication, wherein the at least one reclaimed TO occurs after the offset.

Aspect 16: The method of any of aspects 1 through 15, further comprising: transmitting an additional UTO indication to the network entity, the additional UTO indication reclaiming the at least one reclaimed TO as a used TO for transmission of the packet.

Aspect 17: An apparatus configured for wireless communication at a user equipment (UE) comprising one or more memories and one or more processors coupled to the one or more memories, the one or more processors configured to perform a method of any of aspects 1 through 16.

Aspect 18: An apparatus configured for wireless communication at a user equipment (UE) comprising means for performing a method of any of aspects 1 through 16.

Aspect 19: A non-transitory computer-readable medium having stored therein instructions executable by one or more processors of a user equipment (UE) to perform a method of any one of aspects 1 through 16.

Aspect 20: A method operable at a network entity, the method comprising: obtaining an unused transmission occasion (UTO) indication, the UTO indication releasing one or more unused transmission occasions (TOs) of a plurality of future configured grant (CG) physical uplink shared channel (PUSCH) TOs configured for transmission of a packet by a user equipment (UE); and providing a reclaim indication indicating at least one reclaimed TO of the one or more unused TOs that can be reclaimed by the UE for transmission of the packet.

Aspect 21: The method of aspect 20, further comprising: providing downlink control information (DCI) comprising the reclaim indication.

Aspect 22: The method of aspect 21, wherein the DCI comprises a scheduling DCI scheduling an uplink transmission or a downlink transmission conflicting with at least one used TO of the plurality of future CG PUSCH TOs planned to be used by the UE for transmission of the packet, a slot format indicator DCI indicating a slot format of one or more slots conflicting with the at least one used TO, an uplink cancellation DCI canceling the at least one used TO, or a CG activation DCI activating a CG that conflicts with the at least one used TO.

Aspect 23: The method of any of aspects 20 through 22, wherein the reclaim indication comprises a single bit with a Boolean value indicating whether a first unused TO or each unused TO of the one or more TOs of the one or more unused TOs after the reclaim indication or after a time period from a reference time associated with the reclaim indication can be reclaimed by the UE as the at least one reclaimed TO.

Aspect 24: The method of any of aspects 20 through 22, wherein the reclaim indication comprises a parameter with an integer value to indicate a selected unused TO or a number of unused TOs of the one or more unused TOs after the reclaim indication or after a time period from a reference time associated with the reclaim indication that can be reclaimed by the UE as the at least one reclaimed TO.

Aspect 25: The method of any of aspects 20 through 22, wherein the reclaim indication comprises a bitmap indicating at least one selected unused TO of the one or more unused TO that can be reclaimed by the UE as the at least one reclaimed TO.

Aspect 26: The method of any of aspects 20 through 25, wherein the reclaim indication comprises an offset from a first unused TO of the one or more unused TOs after the reclaim indication, wherein the at least one reclaimed TO occurs after the offset.

Aspect 27: The method of any of aspects 20 through 26, further comprising: obtaining an additional UTO indication, the additional UTO indication reclaiming the at least one reclaimed TO as a used TO for transmission of the packet.

Aspect 28: An apparatus configured for wireless communication at a network entity comprising one or more memories and one or more processors coupled to the one or more memories, the one or more processors configured to perform a method of any of aspects 20 through 27.

Aspect 29: An apparatus configured for wireless communication at a network entity comprising means for performing a method of any of aspects 20 through 27.

Aspect 30: A non-transitory computer-readable medium having stored therein instructions executable by one or more processors of a network entity to perform a method of any one of aspects 20 through 27.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-5, 8, 13, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a user equipment (UE), the apparatus comprising:

one or more memories; and one or more processors coupled to the one or more memories, the one or more processors being configured to:

transmit an unused transmission occasion (UTO) indication to a network entity, the UTO indication releasing one or more unused transmission occasions (TOs) of a plurality of future configured grant (CG) physical uplink shared channel (PUSCH) TOs configured for transmission of a packet; and receive, via downlink control information (DCI), a reclaim indication from the network entity based on the UTO indication, wherein the reclaim indication indicates at least one reclaimed TO of the one or more unused TOs that can be reclaimed by the UE for transmission of the packet.

2. The apparatus of claim 1, wherein the DCI comprises a scheduling DCI scheduling an uplink transmission or a downlink transmission conflicting with at least one used TO of the plurality of future CG PUSCH TOs planned to be used by the UE for transmission of the packet.

3. The apparatus of claim 1, wherein the DCI comprises a slot format indicator DCI indicating a slot format of one or more slots, the slot format conflicting with at least one used TO of the plurality of future CG PUSCH TOs planned to be used by the UE for transmission of the packet.

4. The apparatus of claim 1, wherein the DCI comprises an uplink cancellation DCI canceling at least one used TO of the plurality of future CG PUSCH TOS planned to be used by the UE for transmission of the packet.

5. The apparatus of claim 1, wherein the DCI comprises a CG activation DCI activating a CG that conflicts with at least one used TO of the plurality of future CG PUSCH TOs planned to be used by the UE for transmission of the packet.

6. The apparatus of claim 1, wherein the DCI comprises a single field carrying the reclaim indication.

7. The apparatus of claim 1, wherein the DCI comprises UE group common DCI, and wherein the UE group common DCI comprises a respective sub-field carrying a respective reclaim indication in each UE field of the UE group common DCI.

8. The apparatus of claim 1, wherein the reclaim indication comprises a single bit with a Boolean value indicating whether a first unused TO of the one or more unused TOs after the reclaim indication or after a time period from a reference time associated with the reclaim indication can be reclaimed by the UE as the at least one reclaimed TO.

9. The apparatus of claim 8, wherein the time period comprises a number of symbols, a number of slots, or an amount of time and the reference time comprises a first symbol carrying the reclaim indication, a last symbol carrying the reclaim indication, a first symbol of a slot carrying the reclaim indication, or a last symbol of the slot carrying the reclaim indication.

10. The apparatus of claim 1, wherein the reclaim indication comprises a parameter with an integer value to indicate a selected unused TO of the one or more unused TOs that can be reclaimed by the UE as the at least one reclaimed TO.

11. The apparatus of claim 1, wherein the reclaim indication comprises a single bit with a Boolean value indicating whether each unused TO of the one or more TOs after the reclaim indication or after a time period from a reference time associated with the reclaim indication can be reclaimed by the UE as the at least one reclaimed TO.

12. The apparatus of claim 1, wherein the reclaim indication comprises a parameter with an integer value to indicate a number of unused TOs of the one or more unused TOs after the reclaim indication or after a time period from a reference time associated with the reclaim indication that can be reclaimed by the UE as the at least one reclaimed TO.

13. The apparatus of claim 1, wherein the reclaim indication comprises a bitmap indicating at least one selected unused TO of the one or more unused TO that can be reclaimed by the UE as the at least one reclaimed TO.

14. The apparatus of claim 1, wherein the reclaim indication comprises an offset from a first unused TO of the one or more unused TOs after the reclaim indication, wherein the at least one reclaimed TO occurs after the offset.

15. The apparatus of claim 1, wherein the one or more processors are further configured to:

transmit an additional UTO indication to the network entity, the additional UTO indication reclaiming the at least one reclaimed TO as a used TO for transmission of the packet.

16. A method operable at a user equipment (UE), the method comprising:

transmitting an unused transmission occasion (UTO) indication to a network entity, the UTO indication releasing one or more unused transmission occasions (TOs) of a plurality of future configured grant (CG) physical uplink shared channel (PUSCH) TOs configured for transmission of a packet; and receiving, via downlink control information (DCI), a reclaim indication from the network entity based on the UTO indication, wherein the reclaim indication indicates at least one reclaimed TO of the one or more unused TOs that can be reclaimed by the UE for transmission of the packet.

17. The method of claim 16, wherein the DCI comprises a scheduling DCI scheduling an uplink transmission or a downlink transmission conflicting with at least one used TO of the plurality of future CG PUSCH TOs planned to be used by the UE for transmission of the packet, a slot format indicator DCI indicating a slot format of one or more slots conflicting with the at least one used TO, an uplink cancellation DCI canceling the at least one used TO, or a CG activation DCI activating a CG that conflicts with the at least one used TO.

18. The method of claim 16, wherein the reclaim indication comprises a single bit with a Boolean value indicating whether a first unused TO or each unused TO of the one or more TOs of the one or more unused TOs after the reclaim indication or after a time period from a reference time associated with the reclaim indication can be reclaimed by the UE as the at least one reclaimed TO.

19. The method of claim 16, wherein the reclaim indication comprises a parameter with an integer value to indicate a selected unused TO or a number of unused TOs of the one or more unused TOs after the reclaim indication or after a time period from a reference time associated with the reclaim indication that can be reclaimed by the UE as the at least one reclaimed TO.

20. The method of claim 16, wherein the reclaim indication comprises a bitmap indicating at least one selected unused TO of the one or more unused TO that can be reclaimed by the UE as the at least one reclaimed TO.

21. The method of claim 16, wherein the reclaim indication comprises an offset from a first unused TO of the one or more unused TOs after the reclaim indication, wherein the at least one reclaimed TO occurs after the offset.

22. The method of claim 16, further comprising:

transmitting an additional UTO indication to the network entity, the additional UTO indication reclaiming the at least one reclaimed TO as a used TO for transmission of the packet.

23. An apparatus for wireless communication at a network entity, the apparatus comprising:

one or more memories; and one or more processors coupled to the one or more memories, the one or more processors being configured to:

obtain an unused transmission occasion (UTO) indication, the UTO indication releasing one or more unused transmission occasions (TOs) of a plurality of future configured grant (CG) physical uplink shared channel (PUSCH) TOs configured for transmission of a packet by a user equipment (UE); and provide, via downlink control information (DCI), a reclaim indication based on the UTO, wherein the reclaim indication indicates at least one reclaimed TO of the one or more unused TOs that can be reclaimed by the UE for transmission of the packet.

24. The apparatus of claim 23, wherein the DCI comprises a scheduling DCI scheduling an uplink transmission or a downlink transmission conflicting with at least one used TO of the plurality of future CG PUSCH TOs planned to be used by the UE for transmission of the packet, a slot format indicator DCI indicating a slot format of one or more slots conflicting with the at least one used TO, an uplink cancellation DCI canceling the at least one used TO, or a CG activation DCI activating a CG that conflicts with the at least one used TO.

25. The apparatus of claim 23, wherein the one or more processors are further configured to:

obtain an additional UTO indication, the additional UTO indication reclaiming the at least one reclaimed TO as a used TO for transmission of the packet.

26. A method operable at a network entity, the method comprising:

obtaining an unused transmission occasion (UTO) indication, the UTO indication releasing one or more unused transmission occasions (TOs) of a plurality of future configured grant (CG) physical uplink shared channel (PUSCH) TOs configured for transmission of a packet by a user equipment (UE); and providing, via downlink control information (DCI), a reclaim indication based on the UTO, wherein the reclaim indication indicates at least one reclaimed TO of the one or more unused TOs that can be reclaimed by the UE for transmission of the packet.

* * * * *